(12) United States Patent
Shimizu et al.

(10) Patent No.: US 11,076,104 B2
(45) Date of Patent: Jul. 27, 2021

(54) CAMERA-EQUIPPED PORTABLE INFORMATION TERMINAL DEVICE

(71) Applicant: MAXELL, LTD., Kyoto (JP)

(72) Inventors: Hiroshi Shimizu, Oyamazaki (JP); Motoyuki Suzuki, Oyamazaki (JP); Yasunobu Hashimoto, Oyamazaki (JP); Tomonori Nomura, Oyamazaki (JP); Kazuhiko Yoshizawa, Oyamazaki (JP)

(73) Assignee: MAXWELL, LTD., Kyoto (JP)

( * ) Notice: Subject to any disclaimer, the term of this patent is extended or adjusted under 35 U.S.C. 154(b) by 176 days.

(21) Appl. No.: 16/086,263

(22) PCT Filed: Feb. 23, 2017

(86) PCT No.: PCT/JP2017/006828
§ 371 (c)(1),
(2) Date: Sep. 18, 2018

(87) PCT Pub. No.: WO2017/169362
PCT Pub. Date: Oct. 5, 2017

(65) Prior Publication Data
US 2020/0296275 A1    Sep. 17, 2020

(30) Foreign Application Priority Data

Mar. 31, 2016   (JP) .............................. JP2016-071012
May 11, 2016   (JP) .............................. JP2016-095268

(51) Int. Cl.
*H04N 5/235*   (2006.01)
*H04W 4/029*   (2018.01)
(Continued)

(52) U.S. Cl.
CPC ........... *H04N 5/2354* (2013.01); *G03B 15/05* (2013.01); *H04N 5/2351* (2013.01);
(Continued)

(58) Field of Classification Search
CPC .. H04N 5/2354; H04N 5/23206; H04N 5/235; H04N 5/2351; H04W 4/21; H04W 4/029; G03B 15/05
See application file for complete search history.

(56) References Cited

U.S. PATENT DOCUMENTS

2003/0133018 A1   7/2003 Ziemkowski
2005/0213147 A1*  9/2005 Minatogawa ......... G06F 16/958
                                                      358/1.15
(Continued)

FOREIGN PATENT DOCUMENTS

JP   2003-087615 A   3/2003
JP   2003-274251 A   9/2003
(Continued)

OTHER PUBLICATIONS

International Search Report issued in corresponding International Patent Application No. PCT/JP2017/006828, dated May 23, 2017, with English Translation.

*Primary Examiner* — Ahmed A Berhan
(74) *Attorney, Agent, or Firm* — McDermott Will & Emery LLP

(57) ABSTRACT

The present invention makes it possible to perform good illumination and obtain a good captured image when a plurality of users each having a camera-equipped portable information terminal device gather in the same place. A camera-equipped portable information terminal device is provided with: an imaging unit that captures an image of a subject; a first illumination means for illuminating the subject; a first communication unit that communicates with other portable information terminal devices; and a first control unit that controls the imaging unit and the first communication unit. The first control unit transmits a light emission instruction signal to the other portable information terminal devices via the first communication unit, and
(Continued)

causes a second illumination means of each of the other portable information terminal devices to emit light in tandem with an imaging operation of the imaging unit.

17 Claims, 28 Drawing Sheets

(51) Int. Cl.
 *H04W 4/21* (2018.01)
 *G03B 15/05* (2021.01)
 *H04N 5/232* (2006.01)
(52) U.S. Cl.
 CPC ........ *H04N 5/23206* (2013.01); *H04W 4/029* (2018.02); *H04W 4/21* (2018.02)

(56) References Cited

U.S. PATENT DOCUMENTS

| | | | |
|---|---|---|---|
| 2007/0130198 A1 | 6/2007 | Kikuchi | |
| 2008/0298793 A1* | 12/2008 | Clark | H04N 5/23203 396/57 |
| 2009/0136224 A1 | 5/2009 | Aoyagi | |
| 2009/0248703 A1* | 10/2009 | Tsukagoshi | G06F 16/58 |
| 2012/0268611 A1* | 10/2012 | Kimijima | H04N 1/00137 348/207.1 |
| 2013/0120636 A1* | 5/2013 | Baer | G03B 15/05 348/335 |
| 2013/0242135 A1* | 9/2013 | Muraki | H04N 5/23229 348/231.5 |

FOREIGN PATENT DOCUMENTS

| | | |
|---|---|---|
| JP | 2004-208123 A | 7/2004 |
| JP | 2004-297414 A | 10/2004 |
| JP | 2005-130030 A | 5/2005 |
| JP | 2005-301096 A | 10/2005 |
| JP | 2007-156995 A | 6/2007 |
| JP | 2007-166143 A | 6/2007 |
| JP | 2009-015308 A | 1/2009 |
| JP | 2009-259239 A | 11/2009 |
| JP | 2011-234321 A | 11/2011 |
| JP | 2012-227814 A | 11/2012 |
| JP | 2013-225826 A | 10/2013 |

\* cited by examiner

F I G. 2
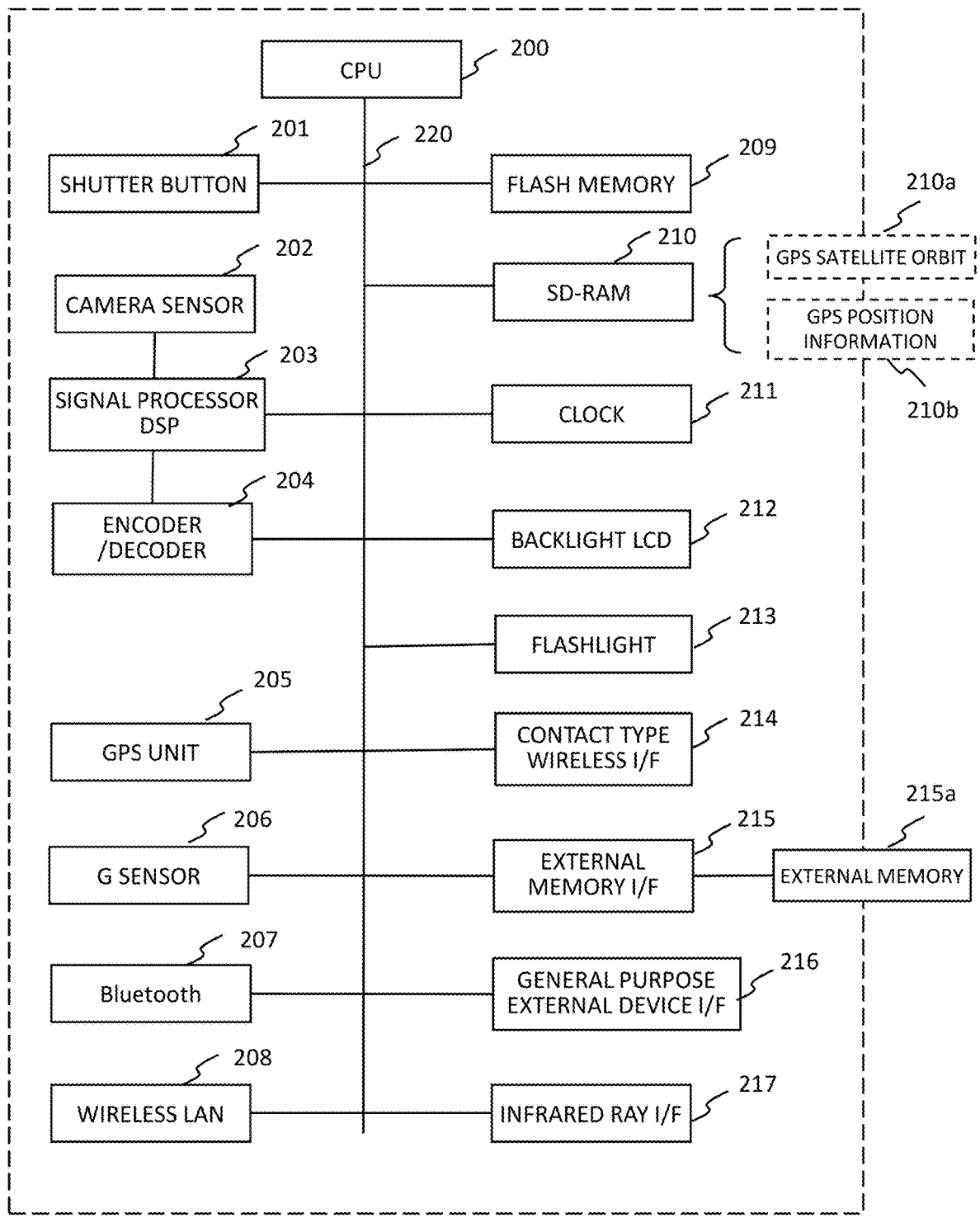

F I G. 1 3 (a)
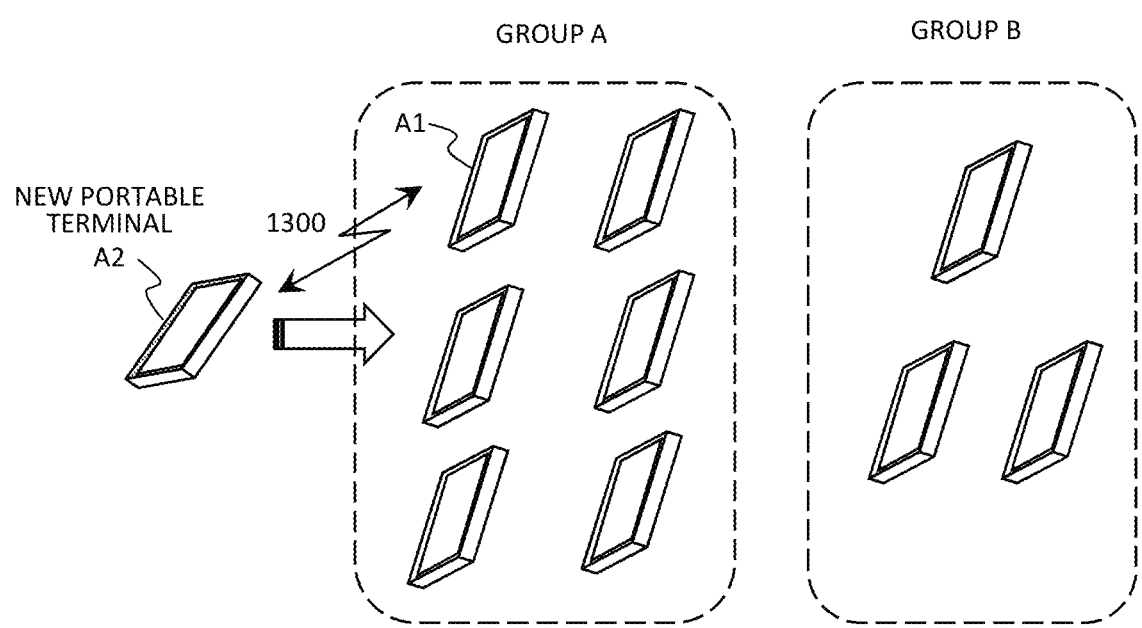

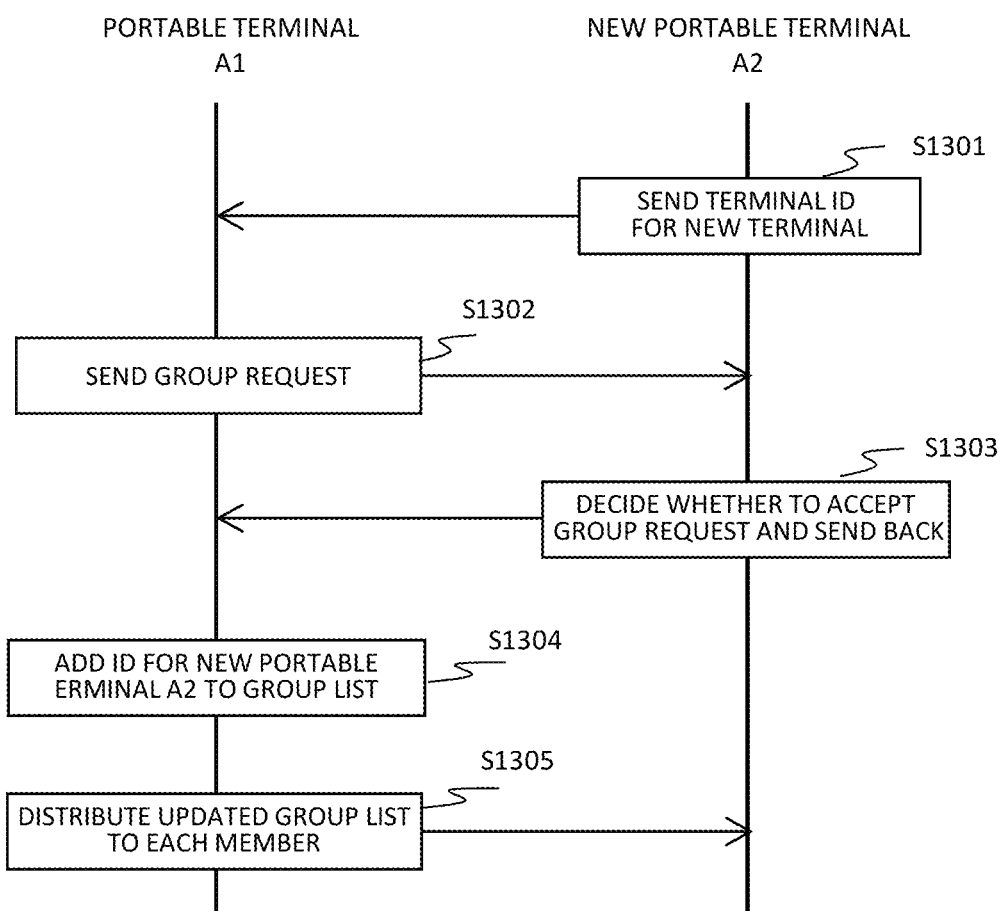
F I G. 1 3 (b)

F I G. 1 4 ( a )
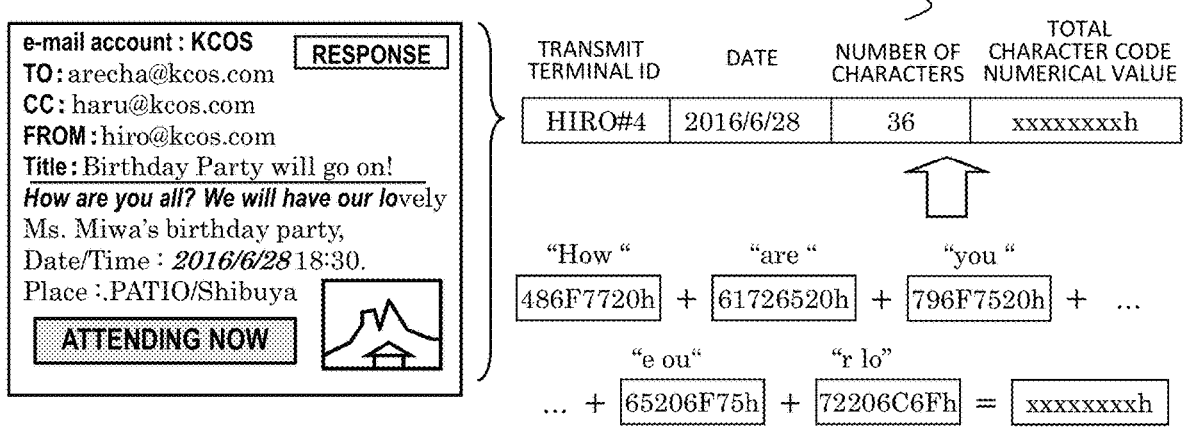

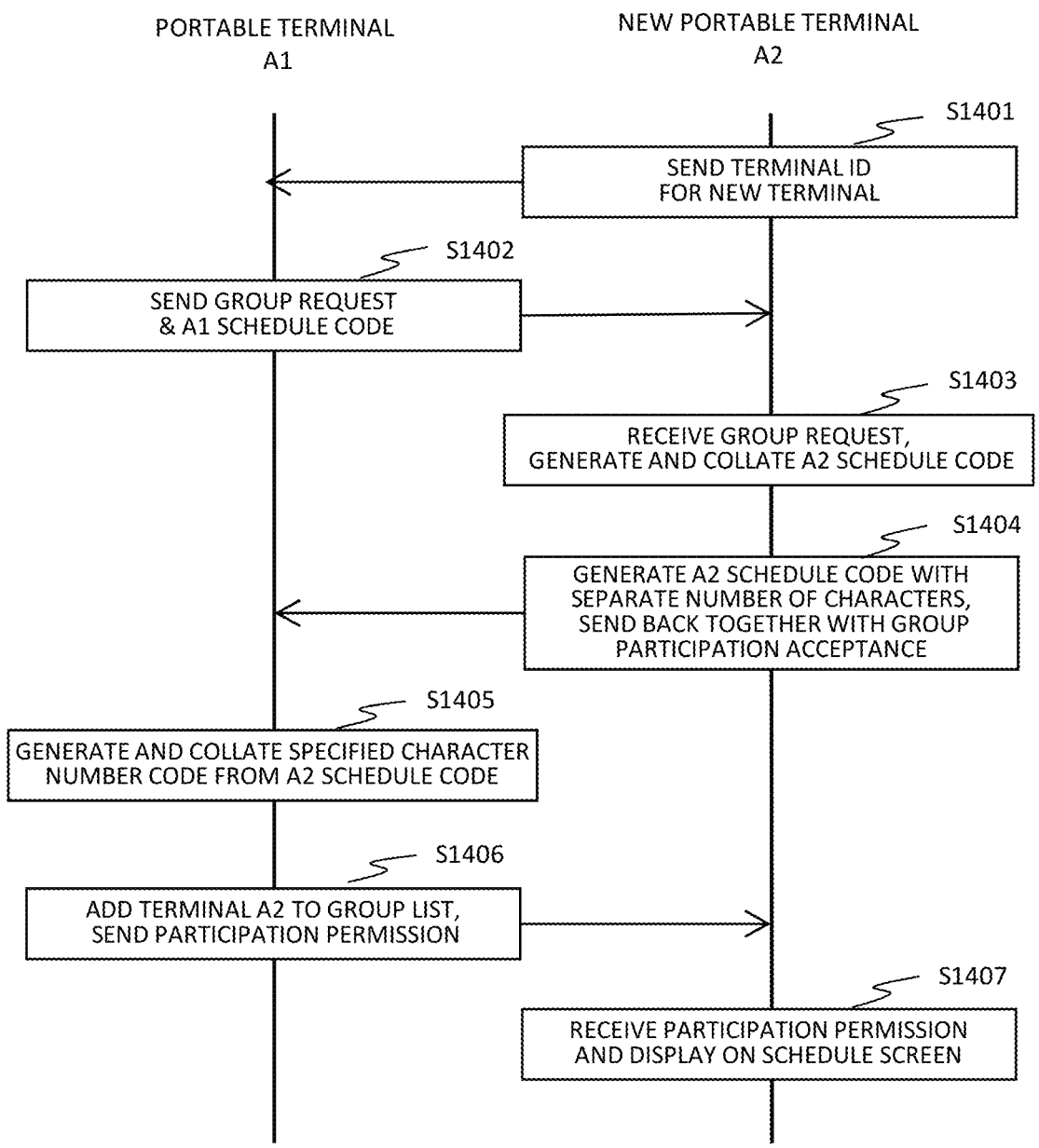

GROUPING FLOW PATHS

IMAGE SHARING FLOW PATH

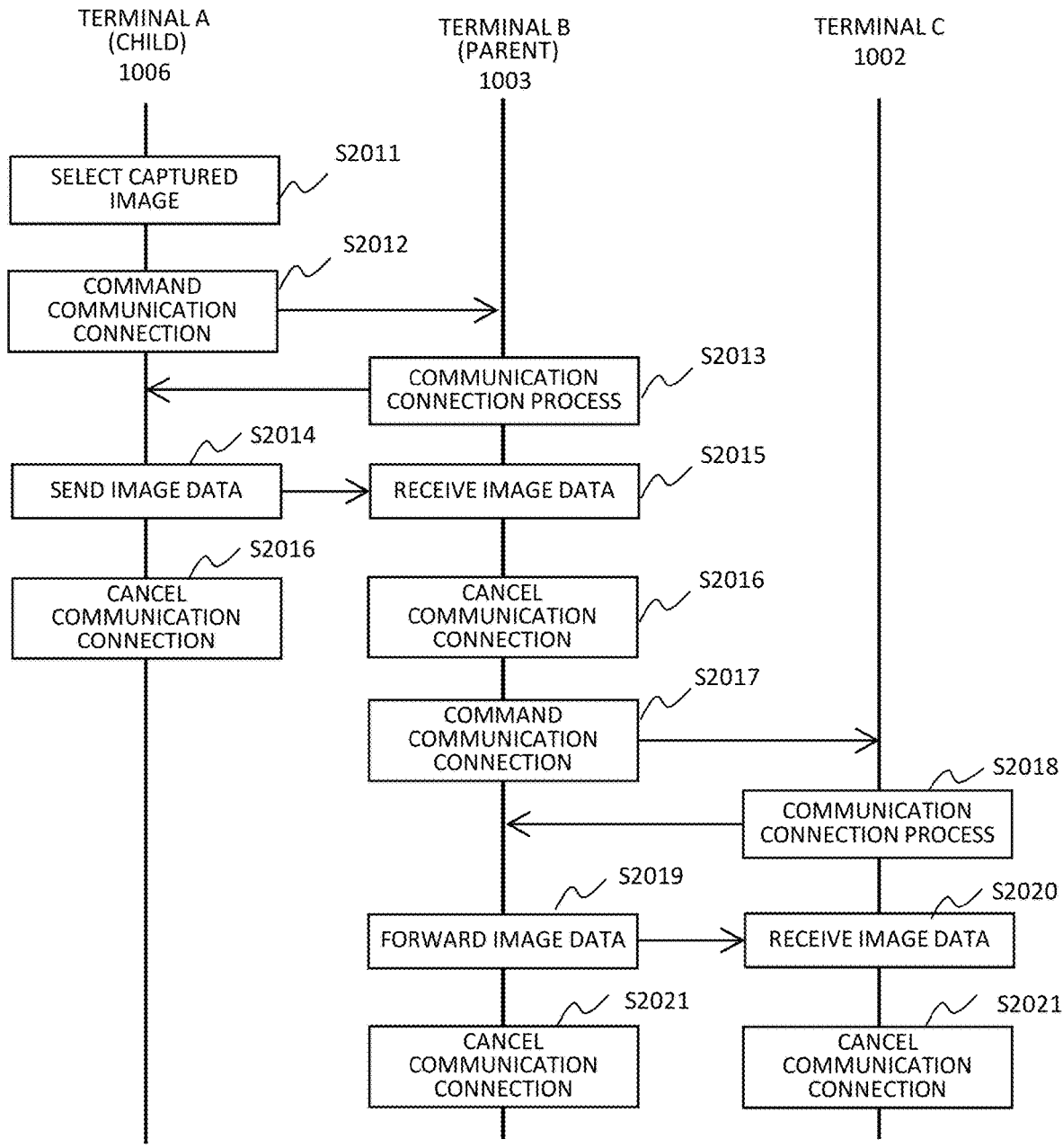

F I G. 1 8 C
GROUP WITHDRAW PROCESS
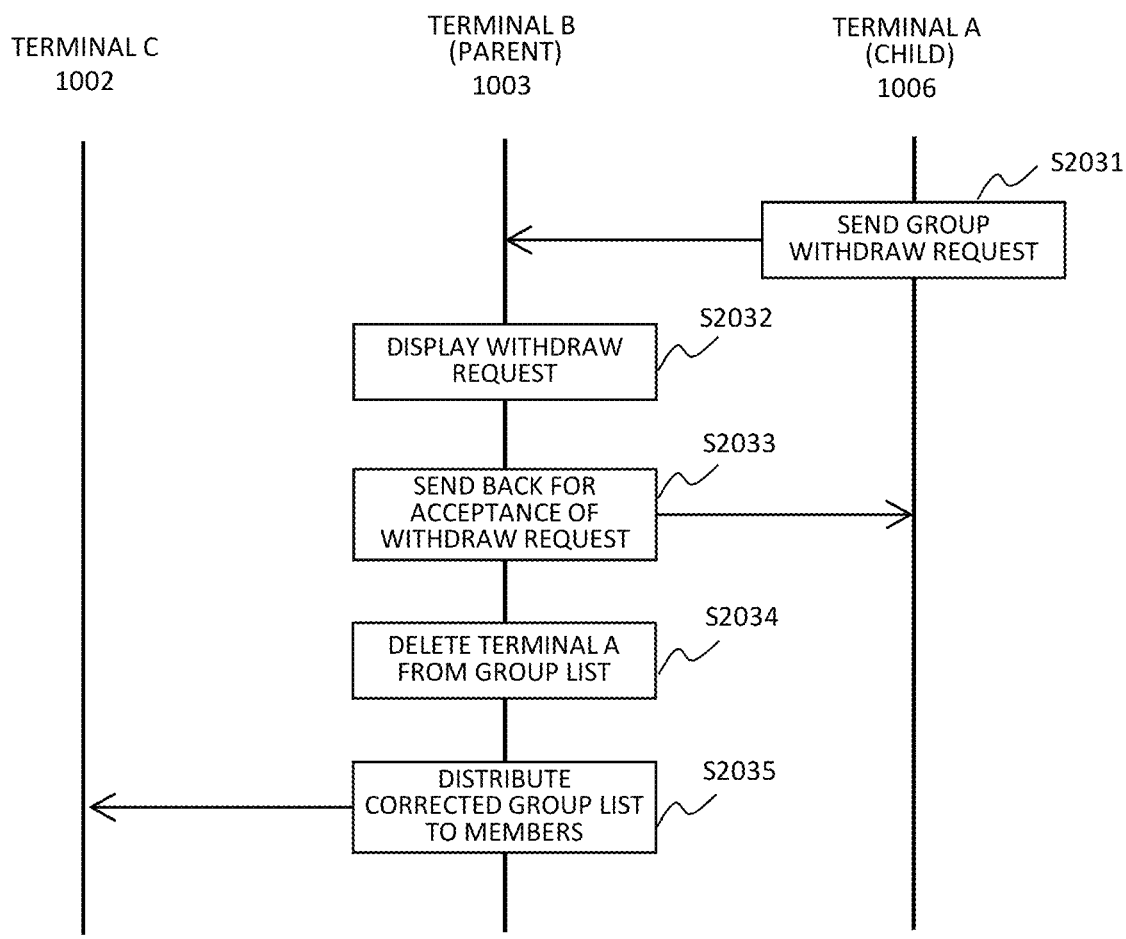

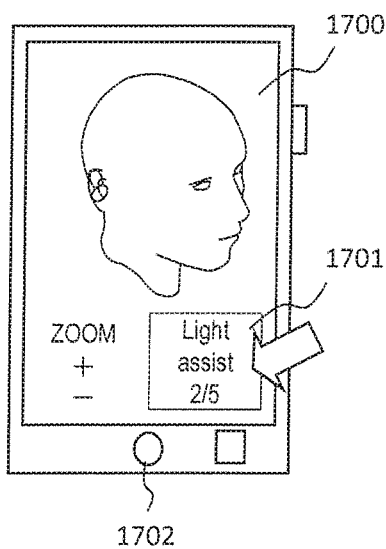
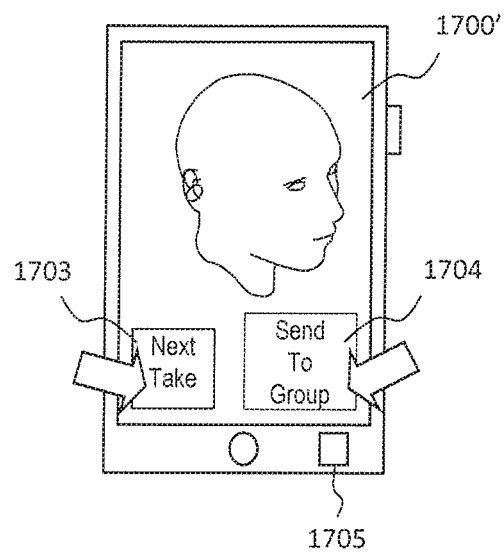
F I G. 1 9 (a)          F I G. 1 9 (b)

THUMBNAIL DISPLAY EXAMPLE

FOLDER LAYOUT EXAMPLE (THUMBNAIL DISPLAY EXAMPLE ized Patent Application Publication No. 2005-301096
CAMERA-EQUIPPED PORTABLE INFORMATION TERMINAL DEVICE

CROSS REFERENCE

This application is the U.S. National Phase under 35 U.S.C. § 371 of International Application No. PCT/JP2017/006828, filed on Feb. 23, 2017, which claims the benefit of Japanese Application No, 2016-071012, filed on Mar. 31, 2016 and Japanese Application No. 2016-095268, filed on May 11, 2016, the entire contents of each are hereby incorporated by reference.

TECHNICAL FIELD

The present invention relates to a camera-equipped portable information terminal device capable of capturing images and relates in particular to technology for capturing better images by linking with other portable information terminal devices capable of communication.

BACKGROUND ART

Digital type cameras (hereafter, digital cameras) that acquire two-dimensional captured images of the subject by passing images of the subject through the imaging lens to a camera sensor comprised of a semiconductor, and detecting the amount of light incident on each pixel; and portable information terminal devices (hereafter, camera-equipped portable information terminal devices) including smartphones containing this type of camera are becoming widely used.

Here, achieving satisfactory image quality when capturing an image with a digital camera or camera-equipped portable information terminal device requires illuminating the subject serving as target for imaging with a sufficient amount of light. Image capture at parties and group dinners in particular is often made in dimly lit indoor areas and in order to capture images in these types of environments, cameras are equipped with an internal or externally mounted device such as a strobe and a flash using LED to illuminate the subject.

Generally, a camera includes one internal flash and particularly in a small camera with an internal flash, increasing the distance from the optical axis of the imaging lens to the flash emission section is impossible. Consequently most of the entire subject image captured by the lens is illuminated by the light from the flash so adding light shadows to the subject is difficult. When capturing an image of a person's face for example, adding shadows that allow viewing the protrusions and hollows on the face such as the eyes, nose, and lips and so on is impossible so that capturing a good quality portrait image is also difficult.

One countermeasure in general studio photography is to mount multiple flash units at positions separate from the camera position. An external flash emits a light flash in synchronization with light emission from the camera internal flash; or a hot shoe or X synchro socket mounted on the camera is utilized to emit multiple flashes by a light emission command signal from the camera. By illuminating the subject from multiple flash units at various positions, the shadows on a face can be favorably expressed and good quality portraits can be captured.

In regards to the related art, PTL 1 discloses a photographic system that sets the lighting conditions whenever needed according to the image capturing circumstances by detecting the lighting or illumination environment in the photo studio just prior to capturing the image and feeding back those detection results to a means for setting the strobe light emission conditions.

On the other hand, an image sharing system is known in the related art as a method for managing captured images to jointly share multiple images provided from users, with multiple users. PTL 2 discloses an imaging sharing system having the object of jointly sharing image data in an easily usable form among sharing partners from the vast quantity of image groups in servers on the network.

CITATION LIST

Patent Literature

PTL 1: Japanese unexamined Patent Application Publication No. 2005-301096
PTL 2: Japanese unexamined Patent Application Publication No. 2009-259239

SUMMARY OF INVENTION

Technical Problem

The method disclosed in PTL 1 utilizing multiple lighting or illuminating devices such as flash units is easily usable for image capture in photo studios but is difficult for an ordinary user having a regular camera-equipped portable information terminal device or digital camera. The reason for the difficulty is that indoor commemorative photography or image capture at party halls and group dinner locations requires that the user always carry along multiple lighting or illuminating devices, which creates the problem of increasing costs as well as the amount of work involved in the photography. Therefore, unless one is a professional cameraman specializing in capturing images of people's faces, always taking along this amount of equipment is extremely difficult. Consequently, even in cases where many users having typical camera-equipped portable information terminal devices or digital cameras are gathered together at a party hall or group dinner location, each user could only make use of the one flash unit within their own camera for photography.

The images captured (photographed) at the party hall or group dinner location are preferably instantaneously distributed to the attending users at that location. The image sharing system disclosed in PTL 2 is a type that utilizes servers on a network but gives no consideration to instantaneously delivering images to those persons attending a party, etc.

An object of the present invention is to provide a camera-equipped portable information terminal device capable of satisfactory illumination and acquiring satisfactory images at places where multiple users having camera-equipped portable information terminal devices have gathered together at the same location. Another objective is to instantaneously send the captured images to multiple users.

Solution to Problem

The aforementioned problems can be resolved by the present invention as described in the claims. As one example, a camera-equipped portable information terminal device includes an imaging unit that captures an image of a subject; a first illumination means for illuminating the subject; a first communication unit that communicates with other portable information terminal devices; and a first control unit that controls the imaging unit and the first communication unit, and in which the first control unit sends a light emission control signal to the other portable information terminal devices via the first communication unit, and causes a second illumination means of each of the other portable information terminal devices to emit light in tandem with the imaging operation of the imaging unit.

Or, in another example, a camera-equipped portable information terminal devices includes an imaging unit that captures an image of a subject; a first communication unit that communicates with other portable information terminal devices; and a first control unit that controls the first communication unit, and in which the first control unit forms a group capable of mutual communication within the local area by communicating with the other portable information terminal devices by way of the first communication unit, and along with sending image data captured by the imaging unit to the other portable information terminal devices in the group by way of the first communication unit, also receives image data sent from the other portable information terminal devices.

Advantageous Effects of Invention

The present invention links with other portable information terminal devices gathered at the same location when capturing images of the subject by way of a camera-equipped portable information terminal device and provides a light assist so that the user can easily obtain satisfactory captured images without having to carry lighting or illumination devices. Moreover, the images captured by the camera-equipped portable information terminal device can be instantaneously viewed by other portable information terminal device users.

BRIEF DESCRIPTION OF DRAWINGS

FIG. 2 is a block diagram showing the internal structure of the camera-equipped portable information terminal device.

FIGS. 13(a), 13(b), and 13(c) are a drawing and flow charts, respectively, for describing the grouping of the portable terminal and the communication processing for the linked imaging.

FIGS. 14(a) and 14(b) are a drawing and flow chart for describing the communication method using mail and schedule data held by the portable terminal.

FIG. 18B is a flow chart showing the processing for sending the image from the portable terminal.

FIG. 18C is a flow chart showing the processing for the portable terminal to withdraw from the group.

FIGS. 19(a) and 19(b) are drawings showing the operation screen for sending the image from the portable terminal.

DESCRIPTION OF EMBODIMENTS

The examples of the present invention are hereinafter described while referring to the accompanying drawings.

EXAMPLE 1

Figure 1:
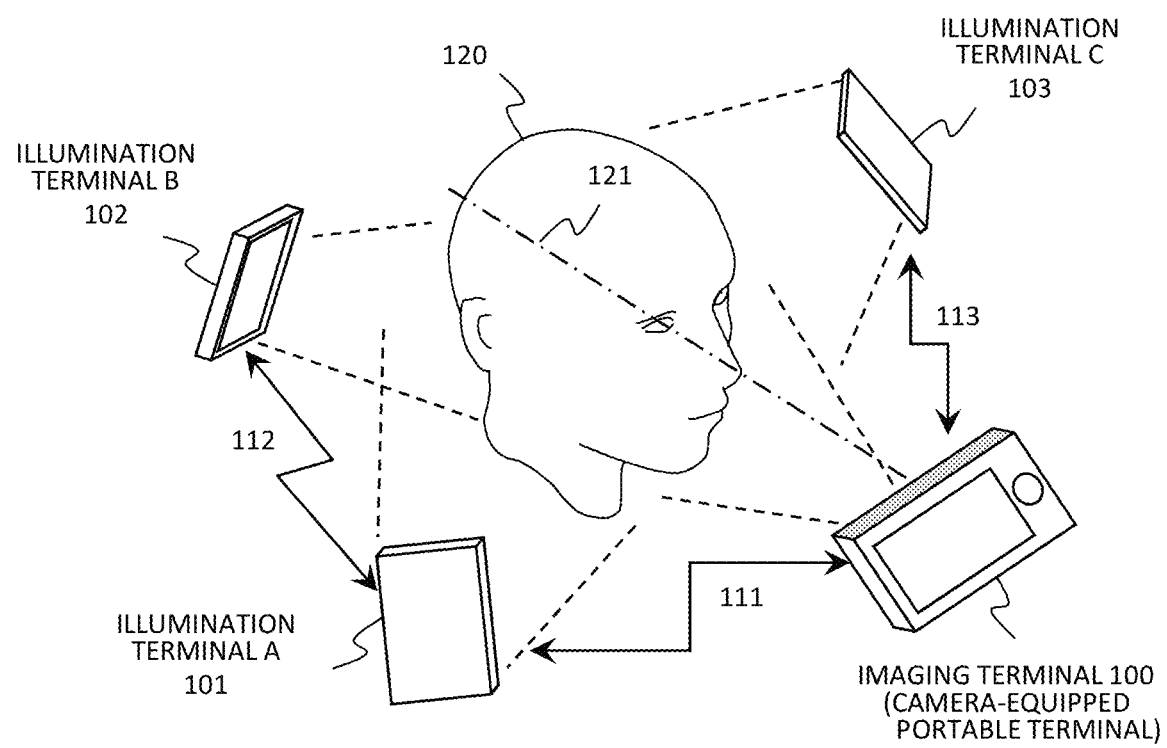
FIG. 1 is a concept image drawing showing the structure of the imaging system, utilizing the camera-equipped portable information terminal device of Example 1.

FIG. 1 is a concept image drawing showing the structure of the imaging system utilizing the camera-equipped portable information terminal device of Example 1. In the imaging system of the present example, plural camera-equipped portable information terminal devices (hereafter, called camera-equipped portable terminals, or simply portable terminals) are utilized to capture an image of a subject 120 such as a person. Among the plural camera-equipped portable terminals, a camera-equipped portable information terminal 100 is a terminal for capturing images. Three other camera-equipped portable terminals A (101), B (102), and C (103) are devices to assist the illumination of the subject 120. Hereafter, the camera-equipped portable terminal for capturing an image is called the "imaging terminal" and the camera-equipped portable terminal for assisting illumination is called the "illumination terminal".

An imaging optical axis 121 of the imaging terminal 100 captures images from the front of the subject 120. The illumination terminals A, B, and C on the other hand, wait at different positions from the imaging terminal 100, and illuminate the subject 120 from different angles. The imaging terminal and the illumination terminals have different roles yet a camera-equipped portable terminal having identical functions can be utilized. Each terminal has a respectively different owner, and each user holds the respective terminals in hand in a state where ready at the specified position. This example assumes that a total of four users with the exception of the subject person take turns performing the imaging. However, if the roles of the imaging terminals and illumination terminals among the plural terminals are firmly established, the illumination terminal does not require an imaging function so a portable information terminal device not having a camera may be employed.

The camera-equipped portable terminal may include a wireless communication function such as an ordinary wireless LAN or Bluetooth (registered trademark) to carry out mutual communication between the terminals. By utilizing this function, the imaging terminal 100 carries out communication 111 with the illumination terminal A (101), and communication 113 with the illumination terminal C (103), and communication 112 with the illumination terminal B (102) via the illumination terminal A (101). Of course, the imaging terminal 100 may also communicate directly with the illumination terminal B (102). By utilizing this communication function the imaging terminal 100 sends a light emission command signal to each illumination terminal and each of the illumination terminals A though C emit light from the internal illumination means (imaging flash light or backlight LCD) to illuminate the subject 120.

The imaging terminal 100 of course includes an illumination means. However, the imaging terminal 100 is mounted in a position near the optical axis 121 of the imaging lens due to the restriction that the flash unit in the imaging terminal 100 is built into the terminal device body. Therefore, when capturing an image of a person's face, light shines from the front of the subject 120 on nearly the same axis as the lens so that there is no shadow from the light on the subject and capturing a satisfactory portrait is difficult.

However, in the present example, light can be illuminated onto the subject from different angles by emitting light by way of the illumination means (LCD with backlight, etc.) in other illumination terminals A, B, and C. As a result, shadows can be added to the nose and ears on the face of the person serving as the subject 120 and a good quality portrait can be photographed with a better stereoscopic effect.

Therefore, each portable terminal is grouped beforehand to set a state allowing mutual communication within the local area of this group. In this group, any portable terminal may operate as an image terminal, and a portable terminal not operating as an illumination terminal may also be included. Any device in the group can operate as an illumination terminal every time a picture is taken. The captured image data can also be automatically distributed to the portable terminals participating in the group by mutual communication.

Therefore, in the present example as described above, when plural users having camera-equipped portable information terminal devices gather together in the same location, other portable information terminal devices link to provide light assist, so that the user can in this way easily obtain a satisfactory captured image without having to carry around plural illumination devices.

FIG. 2 is a block diagram showing the internal structure of the camera-equipped portable information terminal device. The camera-equipped portable information terminal device (camera-equipped portable terminal) 100 of the present example is basically configured as a computer system. A CPU (central processing unit) 200 is the control unit for the entire portable terminal, various types of hardware are connected to the bus 220, and the CPU 200 controls the operation of each hardware unit. In this example in particular, the CPU 200 of the imaging terminal links to the camera image capture operation and communicates with the illumination terminal to issue a light emission command to the illumination terminal. The illumination terminal A (101), B (102), and C (103) have the same structure and the CPU 200 controls the light emission by the illumination means according to the light emission command from the imaging terminal.

The camera-equipped portable terminal includes the following as various types of hardware elements. As a camera imaging unit, a shutter button 201, a camera sensor 202 for converting an optical image focused by an imaging lens (not shown in drawing) into an electrical signal, a signal processor DSP 203 for signal processing of the camera sensor 202, and an encoder/decoder 204 that performs compression processing of a video signal comprised of RGB components obtained by way of the signal processor DSP by utilizing the compression method such as discrete cosine transformation or Huffman coding. The encoder/decoder 204 may also include a function for compression processing of video (moving picture) image and not just still images that are captured. The camera sensor 202, the signal processor DSP 203, and the encoder/decoder 204 need not connect via the bus 220, but may send the output signal from the camera sensor 202 directly to the signal processor DSP 203 and the encoder/decoder 204 and process the video signal. In this case, the bus 220 does not have to pass large size video signals so the bus 220 is not busy handling the video signal and so can perform other tasks along with image capture through compression processing on the device.

Next, the camera-equipped portable terminal includes a GPS unit 205 for acquiring the current position of the camera-equipped portable terminal, a G sensor 206 to measure the acceleration generated by movement of the terminal and a change in the terminal direction, a Bluetooth 207 to carry out short distance wireless communication between external devices such as portable terminal devices, and a wireless LAN 208 that sends and receives information by wireless communication with a portable terminal device and acquires the current position and other information using signals from portable terminal devices and the wireless communication base station. The camera-equipped portable terminal further includes a flash memory 209 to store programs for controlling the entire terminal and basic constants, a SD-RAM 210 which is a work memory to execute programs and store the sequentially updated GPS satellite orbit information 210a, and GPS position information 210b and other information, and a clock 211 to attach a time code to the image information to be stored during image capture and utilize for the previously described GPS position information measurement.

Next, the camera-equipped portable terminal also includes a backlight LCD (liquid crystal display) 212 to show a monitor display of the subject image received by the camera sensor 202 during image capture. The backlight LCD 212 reproduces the captured image data that is stored in the external memory 215a described below and is also utilized for checking and changing the contents set in the terminal. The backlight LCD 212 in the illumination terminals A, B, and C is utilized as an illumination means during image capture by emitting light of a backlight light source. The camera-equipped portable terminal includes a flashlight 213 serving as an illumination means to capture images of the subject by way of the camera sensor 202.

Moreover, the camera-equipped portable terminal also includes a contact type wireless I/F 214 such as NFC (Near Field Communication) to perform data communication by close contact with other devices including a portable terminal; an external memory I/F 215 to store image-captured and compressed image data into the external memory 215a; a general-purpose external device I/F 216 to communicate with external devices by cable; and an infrared ray I/F 217 to receive commands such as for camera shutter operation by way of an infrared remote control and perform wireless communication with other portable terminals by way of infrared rays.

Figure 3:
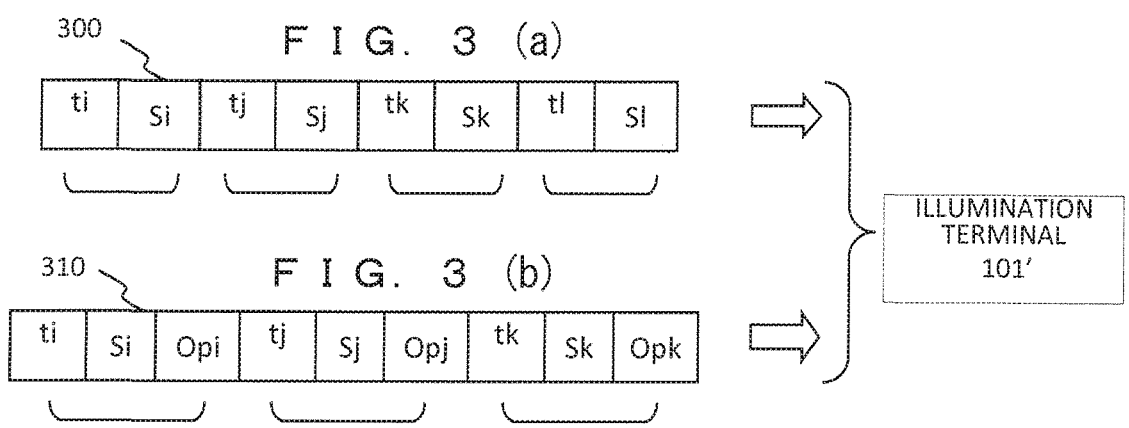
FIGS. 3(a) and 3(b) are diagrams each showing the format of the light emission command signal that the imaging terminal sends to the illumination terminal.

FIG. 3 is a diagram showing the format of the light emission command signal that the imaging terminal sends to the illumination terminal. Two examples of the format of the light emission command signal to send from the imaging terminal to the illumination terminal are shown as: (a) no command, and (b) command. The sending and receiving of the light emission command signal is performed by the Bluetooth 207 or the wireless LAN 208 of the imaging terminal or illumination terminal.

The light emission command signal 300 (no-command) in FIG. 3(a) is a set comprised of a time (namely, a light emission start time) ti for executing the light emission command; and a Si (Smart Terminal ID) to show the ID of the illumination terminal serving as the transmit destination of the light emission command signal and sent as plural (i, j, k . . . ) units to the illumination terminal 101'. This format is the simplest format. The light emission start time ti is for example set as the light emission start time t2 described later on in FIG. 4.

The light emission command signal 310 (command) in FIG. 3(b) is a set comprised of a time ti to execute the light emission command, and Si to show the ID for the illumination terminal serving as the transmit destination for the light emission command signal; and an Opi (Operand) to show the actual content (command) of the light emission command and sent as plural (i, j, k . . . ) units to the illumination terminal 101'. The commands described in the Op include commands having instructions for actual contents of the light emission for example including the light emission start time and light emission end time described later on in FIG. 5, or command values for the light emission color described later on in FIG. 9, or the timing, number of cycles as well as values incidental to those commands.

Hereafter, the relation of the operation timing between the imaging terminal and the illumination terminal is described by grouping the explanation into the shutter scheme and illumination scheme.

Figure 4:
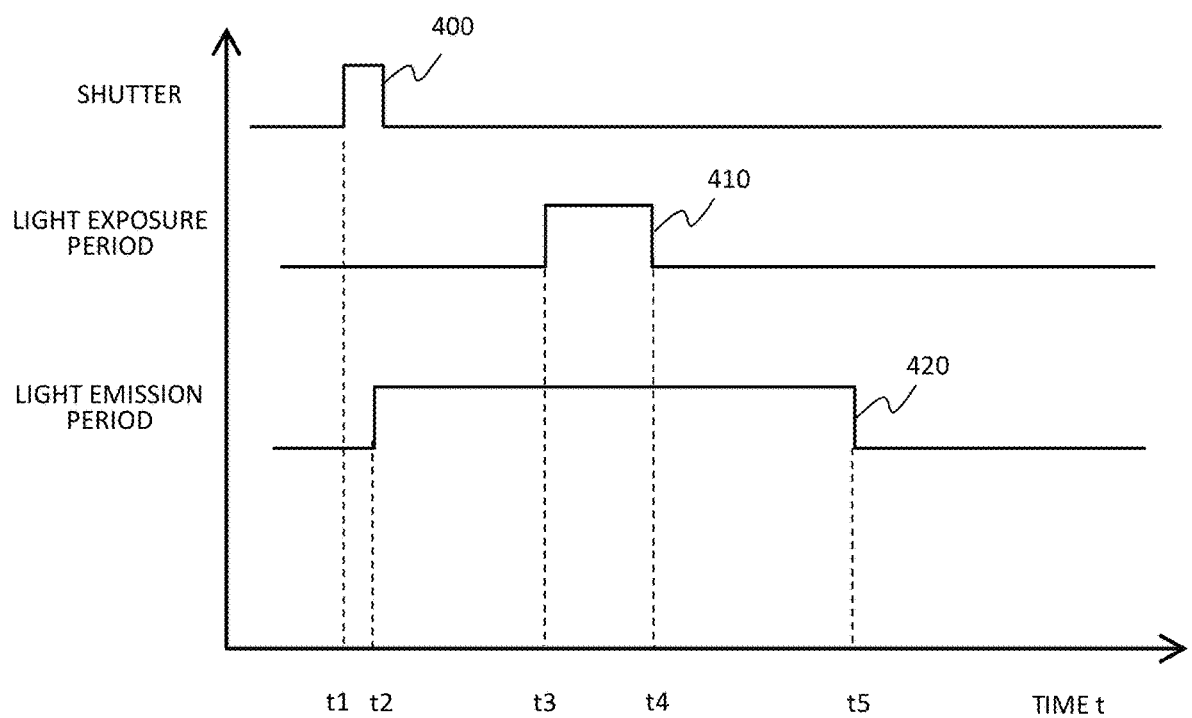
FIG. 4 is a timing diagram showing the relation of the basic operation timing of the imaging terminal and the illumination terminal.

FIG. 4 is a timing diagram showing the relation between the basic operation timing for the imaging terminal and the illumination terminal. This operation is the case where utilizing the light emission command signal 300 as shown in FIG. 3(a).

In the imaging system of FIG. 1, during image capture from the imaging terminal 100, pressing down the shutter button 400 at time t1 sends the light emission command signal 300 of FIG. 3 by the communication 111 through 113 in FIG. 1 to each illumination terminal A (101), B (102), and C (103). Each of the illumination terminals A, B, and C receive the light emission command signal 300 and start emitting light and that light emission state continues in the light emission period 420 from time t2 to time t5. During image capture by the imaging terminal 100, the light exposure period 410 is from time t3 to time t4. The light emission state continues in the time zone including this light exposure period 410 so that image capture can be performed by utilizing the light emission from each illumination terminal. The communications 111 through 113 issue commands separately to each illumination terminal so as to definitely cover the light exposure period 410 at the light emission start time t2 and light emission period 420. Or, the light emission times of each illumination terminal A, B, and C are set in advance so as to definitely cover the maximum light exposure period of a typical camera-equipped portable information terminal.

The imaging system of the present example can be applied to the capture of moving images with the imaging terminal 100. More specifically, if the capture of moving images starts from time t3 which is the start point for the light exposure period 410 in FIG. 4 and ends at time t4 which is the end point for the light exposure period 410, the light emission start time t2 for the illumination terminals A, B, and C may be the same as in FIG. 4. In the case of a long exposure time for capturing moving images, the light emission end time t5 must be extended. In that case, the imaging terminal 100 sends a light emission end command signal to the illumination terminals A, B, and C and the light emission operation ends at the timing that the illumination terminals A, B, and C receive this light emission end command signal.

Figure 5:
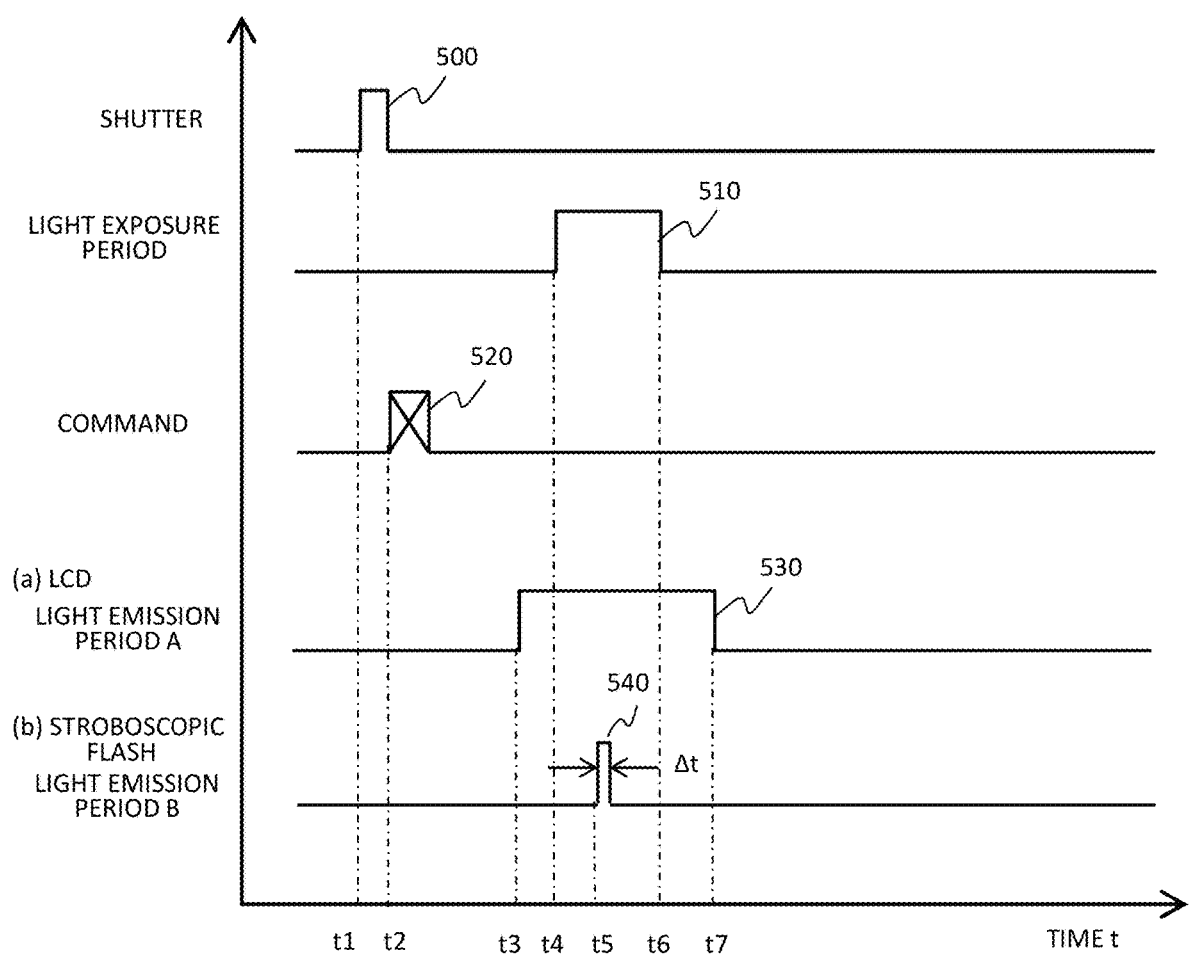
FIG. 5 is a timing diagram showing the relation of the operation timing of the illumination terminal and the imaging terminal when utilizing a command.

FIG. 5 is a timing diagram showing the relation of the operation timing of the illumination terminal and the imaging terminal when utilizing a command. This operation is the case where utilizing the light emission command signal 310 shown in FIG. 3(b).

Pressing the shutter button 500 of the imaging terminal 100 at time t1 sends a command 520 instructing the illumination terminals A (101) through C (103) to emit light. Besides the light emission time, this command 520 includes the information that the light exposure period 510 of the imaging terminal 100 is the period from time t4 to time t6. The illumination terminals A through C receive this command and start light emission. The description of the illumination terminals is here grouped into (a) the case of the backlight LCD, and (b) the case of the stroboscopic flash units.

In the case of (a) using a backlight LCD as the light source for the illumination terminal, the illumination terminal continues the light emission state in the light emission period A (530) from the time t3 to time t7 that the command is instructed. The light exposure period 510 of the imaging terminal 100 is from time t4 to time t6, and the light emission from each illumination terminal is utilized for image capture so that the light emission state can continue in the time zone including this light exposure period 510. In comparing with the light emission period 420 in FIG. 4, in the light emission period A (530) in FIG. 5, a command is issued so as to continue light emission just for the minimum period so as to cover the light exposure period 510. The light emission period is minimal so that power consumption caused by the backlight LCD light emission which is the main factor in battery consumption in the illumination terminal can be kept to a minimum. Here, time t3 and time t7 showing the light emission period may be set for a relative time from time t1, or may be set as an absolute time by synchronizing the internal clock of the imaging terminal with the illumination terminal.

Light emission might not be correct during the light exposure period if an error occurs at this time in the light exposure period 510 of the imaging terminal, and the light emission period 530 of the illumination terminal, so correctly synchronizing the imaging terminal clock with the illumination terminal clock is necessary. Specifically, the imaging terminal clock and the illumination terminal clock must be synchronized in units within one-tenth to one-hundredth of a second. This synchronization is described later on using FIG. 7.

Here, the drawing (b) is the case where the stroboscopic flash mounted in a general digital still camera is the light source for the illumination terminal or a light source that is for example a LED capable of emitting intense light for a short time equivalent to the light from a stroboscopic flash unit. In this case, the light emission period B (540) that the illumination terminal emits light is a sufficiently short time Δt compared to the light exposure period 510 of the imaging terminal but must be inserted within the exposure period 510 of the imaging terminal. Therefore, the shutter button 500 of the imaging terminal is operated at time t1 and light exposure is performed in the period from time t4 to time t6. In parallel with this operation, the imaging terminal sends a command 520 instructing light emission period to each illumination terminal. The imaging terminal knows this exposure period 510 (t4 to t6) and so the command 520 includes the light emission start time t5 and the light emission time Δt so that the illumination terminal emits light during the exposure period. In the illumination terminal, the stroboscopic flash unit emits light only in the light emission period B (540) within the light exposure period 510. Imaging operation can in this way be performed by using light emitted from the stroboscopic flash unit.

The light energy from the stroboscopic flash unit is described here. When the light emission period (light emission time) of the stroboscopic flash unit is Δt, the light energy quantity applied to a film or sensor is the accumulated light from the product of the stroboscopic flash unit light emission quantity L times the light emission period Δt. The light emission time Δt of the stroboscopic flash unit is generally ¹/₁,₀₀₀ to ¹/₁₀,₀₀₀ of a Second and is Extremely Short Compared to the light exposure period (for example ¹/₆₀ of a second or less) of the camera in an environment requiring lighting; however the peak value Lmax of the light quantity L is extremely large so a sufficient accumulated light quantity can be obtained in that short amount of lighting time.

The stroboscopic flash unit includes a function (auto strobe) capable of controlling the accumulated light quantity by changing the light emission time Δt in a period of ¹/₁,₀₀₀ to ¹/₁₀,₀₀₀ of a second. This function cannot control the peak value Lmax of the output light quantity of the light emission element, but can adjust the accumulated light quantity by controlling the light emission time Δt in the auto strobe. More specifically, light emitted for just a ¹/₁₀₀₀ second period during maximum light quantity can be controlled to ¹/₁₀ of the accumulated light quantity by for example changing the light emission time to ¹/₁₀,₀₀₀. An image with the correct light exposure can in this way be captured by just controlling the stroboscopic flash with the shutter speed and shutter closure of the camera still unchanged. In the present example, by setting respectively different light exposure times on each illumination terminal from the imaging terminal, the accumulated light emission quantity on each illumination terminal can be individually controlled, and the accumulated light quantity from illumination terminals emitting light onto the subject for every possible direction can be controlled so that a high quality image can be captured in an ideal illumination state.

Figure 6:
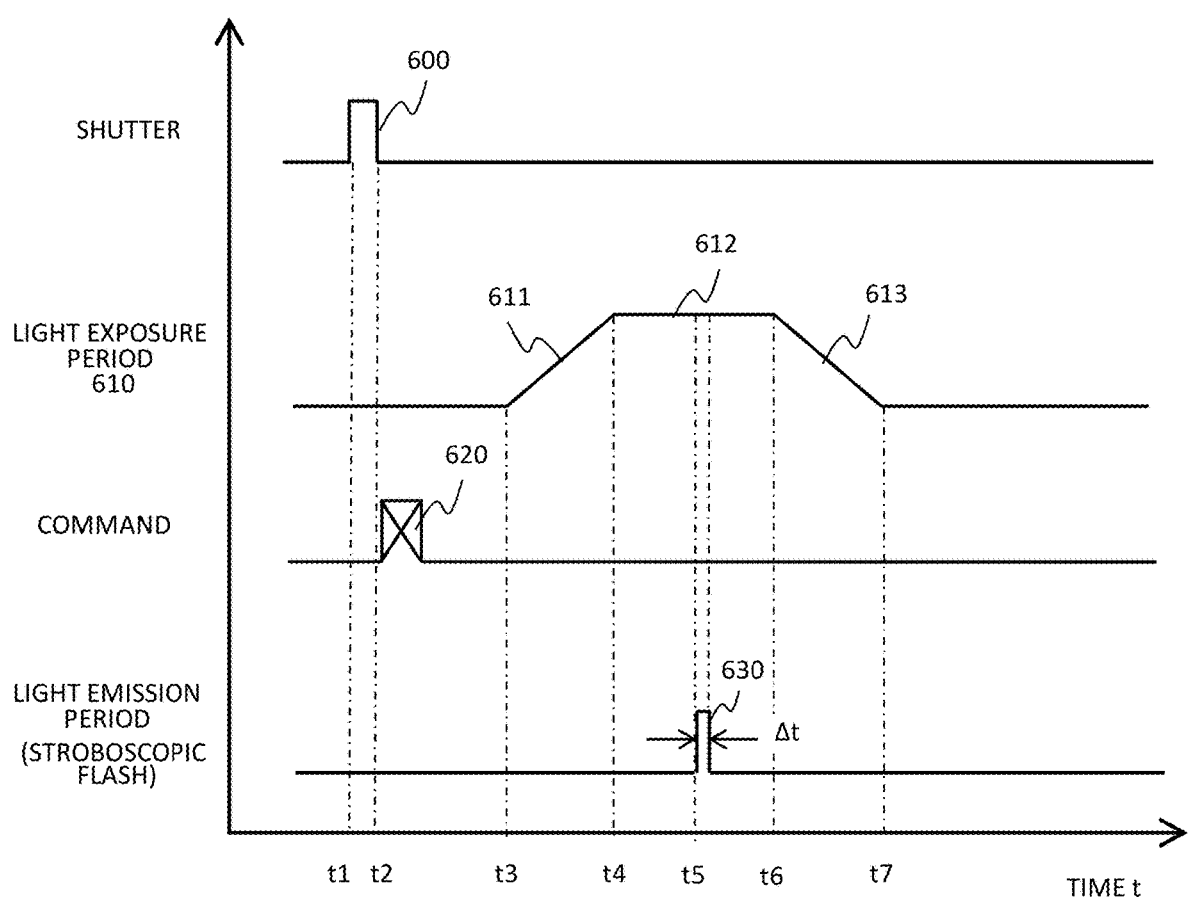
FIG. 6 is a timing diagram showing the operation timing of the imaging terminal and the illumination terminal when utilizing the mechanical shutter.

FIG. 6 is a timing diagram showing the operation timing of the imaging terminal and the illumination terminal when utilizing the mechanical shutter. In this example, the shutter for the imaging terminal is a mechanical shutter such as a focal plane shutter and illustrates the case where the stroboscopic flash unit is the light source for the illumination terminal.

The mechanical shutter operating state when the shutter button 600 is depressed is not only a fully open shutter state but also an intermediate state that applies light to a camera sensor in an intermediate state where the shutter is partially open. In other words, besides a full exposure period 612 corresponding to the fully open shutter, the light exposure period 610 also includes the intermediate light exposure periods 611 and 613 during partially open and closed shutter operation.

In the light emission period 630 of the stroboscopic flash unit, the light emission time is Δt at the light emission start time t5. This light emission period 630 can be set into the full exposure period 612 that is the fully open shutter and not in the intermediate light exposure periods 611 and 613 during the shutter opening and closing operation. All of the light emitted from the stroboscopic flash unit can in this way be utilized for light exposure.

The internal shutter in the imaging terminal 100 itself knows the timing of the time required for shutter opening operation (time t3 to t4) and the time required for shutter closing operation (time t6 to t7). Whereupon, the light emission timing command time contained in the command 620 sent to the illumination terminal, is set in the full exposure period 612 that is the fully open shutter (state) and avoids the intermediate light exposure periods 611 and 613 during shutter opening and closing operation. The light emitted from the stroboscopic flash unit is in this way not partially blocked during shutter opening and closing operation so that an image can be captured at a correct light exposure quantity according to the light emission from the stroboscopic flash unit.

The imaging terminal 100 as described above, commands a light emission timing time to the illumination terminals A (101) and B (102); however the internal clocks of these terminals must have sufficient accuracy to match the mutual time. A typical camera-equipped portable information terminal has a communication function such as a cdma scheme as well as high-accuracy clocks to match the mutual times with high accuracy in order to implement the functions, and no problem occurs if these are used. The method for utilizing the GPS function as a method for high-accuracy time synchronization in digital cameras and portable information terminals not containing the abovementioned high-accuracy clocks is described.

In recent years, digital cameras and camera-equipped portable information terminals have a GPS function serving as a position information acquisition system that is utilized for adding incidental information for image data as coordinate data showing the location where images are captured and recording the movement trail of the portable information terminal. The digital image data in particular is defined in a position coordinate storage format in the standard (Exif) for that attribute information. This GPS function is increasingly being added to more and more cameras because of the convenience it provides in viewing and arranging the pictures after image capture.

In some cdma communication schemes, a GPS time signal is utilized in order to time-synchronize the cells (base stations) for carrying out portable telephone communication. The GPS system finds the current position of a portable terminal by utilizing the difference in radio wave propagation speed between each artificial satellite and the portable terminal. Utilizing the GPS information in this way is effective for carrying out high-accuracy time synchronization. Each artificial satellite therefore has an atomic clock for high accuracy and that time information is applied to the GPS information radio wave and is sent along with the radio wave.

Figure 7:
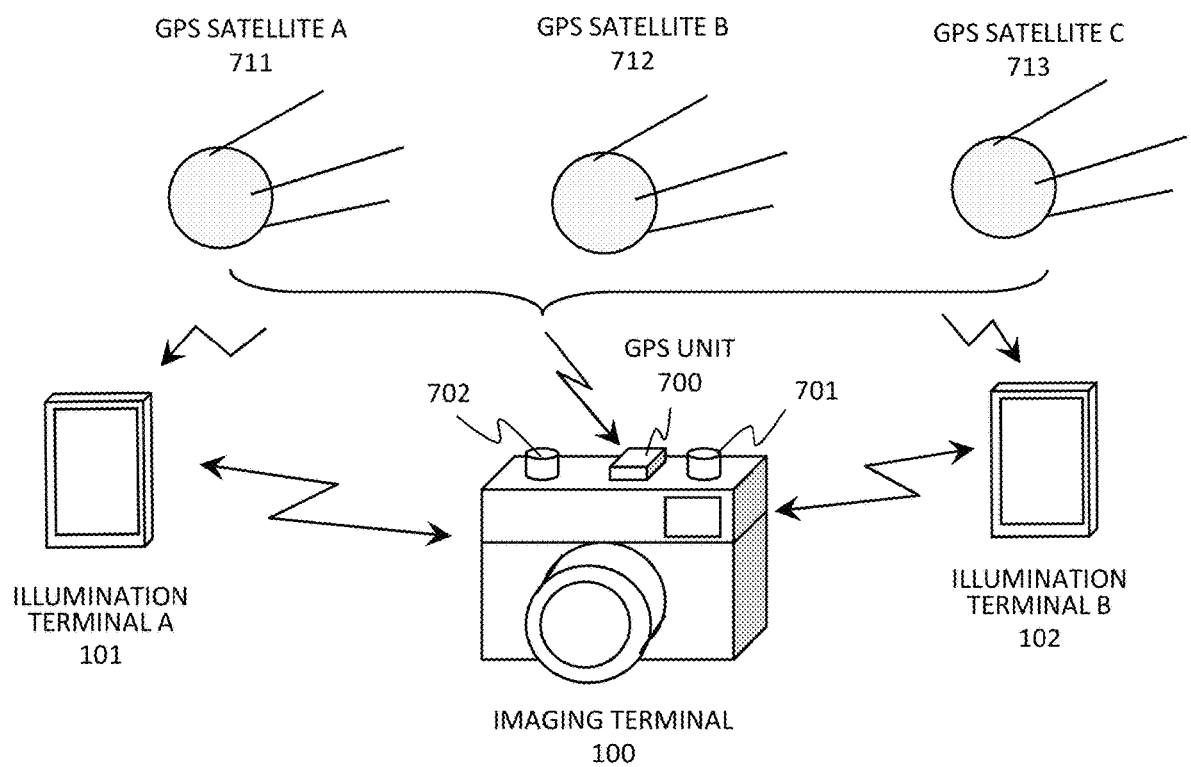
FIG. 7 is a concept image drawing for describing the method for synchronizing the internal time on the imaging terminal with the illumination terminal by utilizing the UPS function.

FIG. 7 is a concept image drawing for describing the method for synchronizing the internal time on the imaging terminal with the illumination terminal by utilizing the GPS function.

The imaging terminal 100 receives the GPS information radio waves from the GPS satellite A (711), GPS satellite B (712), and GPS satellite C (713) by way of the GPS unit 700 mounted in the imaging terminal 100. Two dimensional position coordinates on the earth can be calculated by receiving information from at least three GPS satellites; and three-dimensional position coordinates can be calculated by receiving information from four or more GPS satellites. The imaging terminal 100 starts receiving information from the GPS satellite when the power source SW701 is turned on, and time information contained within the GPS information is utilized to calibrate the clock within the imaging terminal. Also, the imaging terminal 100 calculates the current position coordinates when the shutter button 702 is pressed for image capture, adds the captured image to the position coordinates, and stores them.

The illumination terminal A (101) and illumination terminal B (102) also have the same internal structure as the imaging terminal 100, and receive information from the GPS satellites in the same way, and are capable of calibrating the internal clocks of each illumination terminal.

When measuring the current position coordinates by way of the GPS method, acquiring position information for example with an error of 30 meters is equivalent to time accuracy within 0.1 μseconds. If the clocks could be aligned to this accuracy, a sufficiently small figure could be achieved even compared to the stroboscope light emission time (¹/₁₀,₀₀₀ per second=100 μseconds) or high-speed shutter speed (¹/₈,₀₀₀ seconds=125 μseconds). There is also a sufficient satisfactory accuracy margin even compared to the operating speed of single-lens reflex cameras or mirror-less focal plane shutter, or namely an X contact point synchronizing speed (approximately ¹/₂₅₀ seconds=4 meters per second). Moreover the imaging terminal and illumination terminal are mutually present in almost the same position so that radio waves from the same artificial satellite are received and operation can be completed with no actual difference in propagation speed occurring due to receiving radio waves from different artificial satellites.

When capturing images of the subject on the camera-equipped portable information terminal device of Example 1, an illumination means within another illumination terminal present at the same location could illuminate the subject from a different angle so that good quality image having a stereoscopic effect could be captured.

EXAMPLE 2

The structure of Example 2 that prevents deterioration of image quality (red-eye phenomenon) during image capture is described next.

Figure 8:
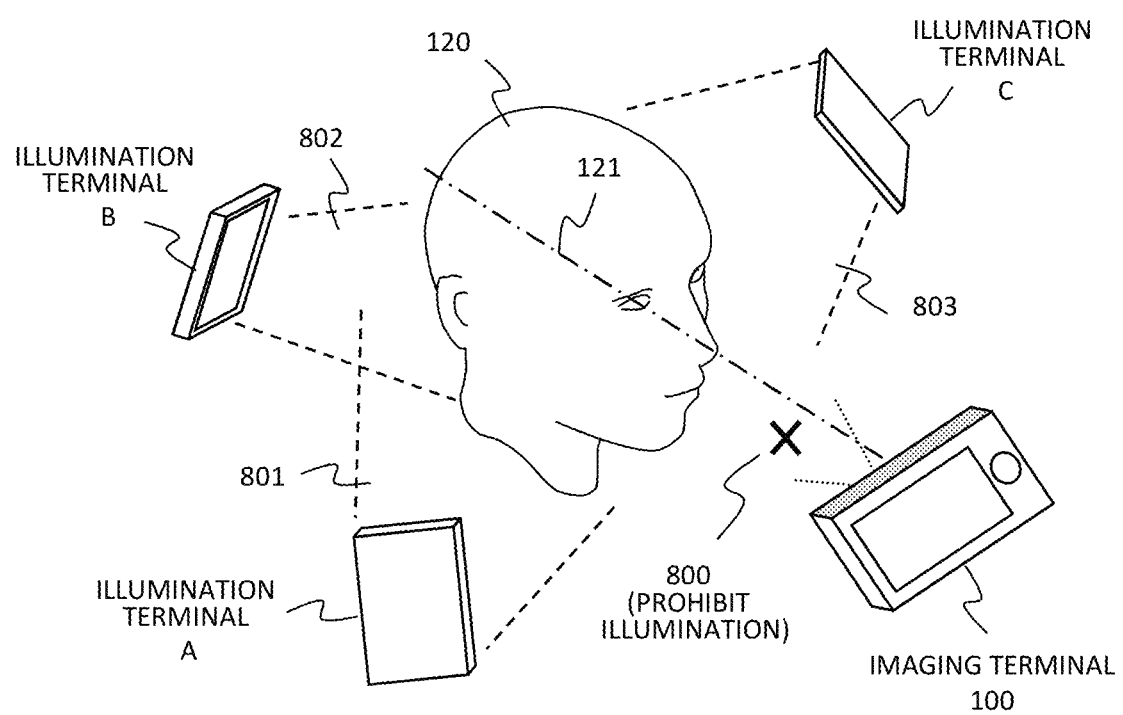
FIG. 8 is a concept image drawing showing the structure of the imaging system of Example 2.

FIG. 8 is a concept image drawing showing the structure of the imaging system of Example 2. Image capture is performed the same as in Example 1 by separately assigning the tasks for the plural camera-equipped portable terminals to the imaging terminal 100 and the illumination terminals A (101), B (102), and C (103) but also in particular prevents deterioration of image quality (red-eye phenomenon) during image capture of a human face.

An image quality deterioration phenomenon called the red-eye phenomenon occurs when the imaging terminal 100 is capturing an image of a human face by using the imaging terminal 100's own light emission section (for example, flashlight 213). This red-eye phenomenon occurs when the light emission section and the imaging lens of the imaging terminal 100 are mounted in close proximity to each other, and light emitted from the light emission section is incident on the ocular fundus of the eyes of the person serving as the subject 120 and reflects the color of the ocular fundi blood vessels or namely red light causing the phenomenon that the eyes of the person in the captured image become red. Generally there is one flash unit within the camera, and when the flash unit is within a small terminal body such as a portable information terminal, a large distance cannot be obtained from the imaging lens optical axis to the light emission section. Therefore, the light from the light emission section is emitted onto nearly the entire subject image captured by the lens.

The imaging system structure of the present example not only includes an imaging terminal 100 that itself has a function for illuminating (flashlight) the subject 120, but that is also capable of utilizing the other illumination terminal A, B, and C (backlight LCD, or flashlight). Whereupon, illumination onto the subject 120 is carried out only with the illumination 801, 802, and 803 from each illumination terminal. In other words, when the optical axis 121 of the imaging terminal 100 is facing the front of the face of the person serving as the subject 120 (eyes are facing toward the camera), the imaging terminal 100 stops using the internal illumination 800.

Therefore, during image capture with the imaging terminal 100, a decision is made whether the face of the subject 120 is facing toward the imaging terminal 100 or more specifically, where the face's line of sight is toward the imaging terminal 100 from the image acquired in advance by the camera sensor to show on a camera finder, etc. If the face's line of sight is not facing the imaging terminal 100, the imaging terminal 100 performs illumination operation, and if the face's line of sight is facing the imaging terminal 100, the illumination 800 by the imaging terminal 100 is prohibited. The present example in this way does not use internal illumination by the imaging terminal 100 when the eyes of the person's face serving as the subject are facing toward the imaging terminal 100 so that deterioration of image quality (red-eye phenomenon) during image capture can be prevented.

EXAMPLE 3

Example 3 describes optimization of the illuminating light (luminescence color, brightness) emitted by the illumination terminal.

Figure 9:
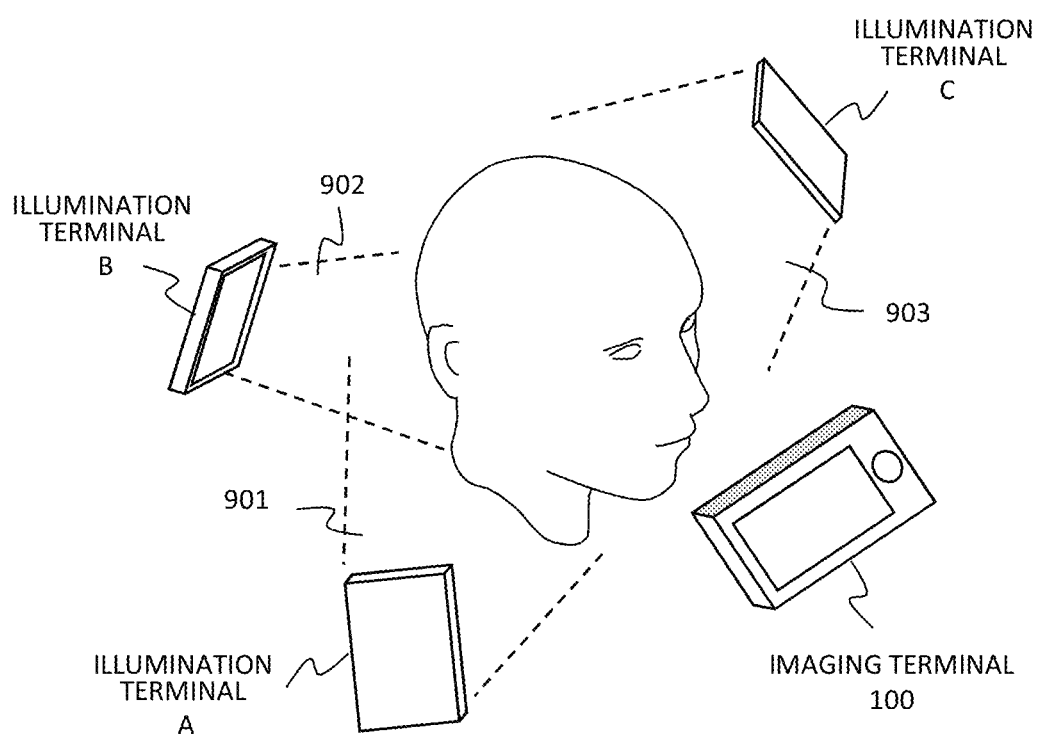
FIGS. 9(a), 9(b), and 9(c) are concept image drawings showing the imaging system of Example 3.
Figure 9:
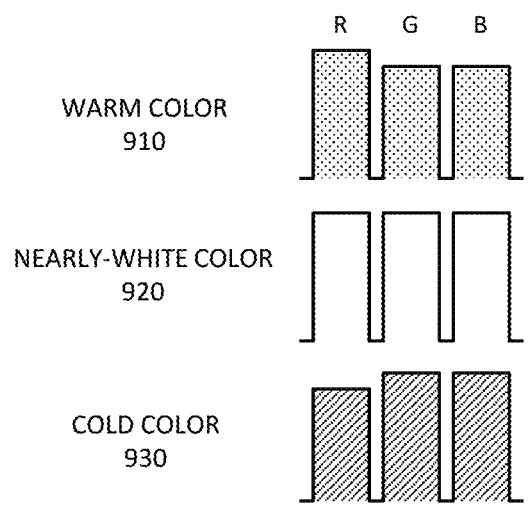
Figure 9:
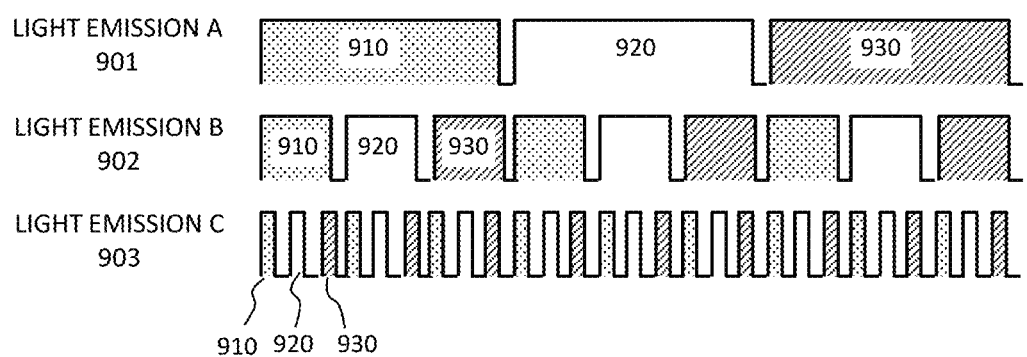

FIG. 9 is concept image drawings showing the imaging system of Example 3. Image capture is performed the same as in Example 1 (FIG. 1) by separately assigning the tasks for the plural camera-equipped portable terminals to the imaging terminal 100 and the illumination terminals A, B, and C; however the illumination light emission by each illumination terminal is optimized. The present example performs a pre-flash before the actual imaging, adjusts the luminescence color and light emission level of each illumination terminal, and sets optimized illumination conditions.

In FIG. 9(*a*), the imaging terminal 100 sends a light emission command signal 310 as shown in FIG. 3(*b*) to the illumination terminals A (101), B (102), and C (103), and the contents of this command include luminescence color and brightness for each illumination terminal. Each illumination terminal A, B, and C performs light emission (illumination) 901, 902, and 903 in compliance with the command. Different light emission conditions may of course be used for each illumination terminal as described below.

The FIG. 9(b) shows an example of changing the illumination terminal luminescence color. The illumination terminal of the present example can freely select the luminescence color by utilizing the light emission from the LCD (color display) in the portable terminal. Usual light emission generally utilizes a light with roughly equivalent brightness for each color red (R), green (G), and blue (B) that are 3 components of the color like the nearly-white color 920. Other simple examples include a warm color 910 expressing a color of warmth having a slightly increased R component, or a cold color 930 expressing a relatively cold color by slightly decreasing the R component, therefore a luminescence color can be selected from these three types and utilized.

The FIG. 9(c) describes a method for setting the ideal illuminance color combination by the pre-flash. The imaging terminal 100 sends a command to the three illumination terminal A, B, and C to cause a pre-flash at each luminescence color at the timings shown in the respective light emission A (901), light emission B (902), and light emission C (903) in the Figure. The luminescence colors at this time are for example set by switching the emission light for a total of 27 patterns at intervals of 1/60 of a second in a round-robin of the above described warm color 910, nearly-white color 920, and cold color 930 combinations. The imaging terminal 100 acquires subject images captured in the pre-flash, and sets conditions for the illumination light nearest the reference color (for example skin color if a person) of the subject image color. The time required for imaging at a frame rate of 60 fps, and acquiring images all illuminated in the 27 pattern colors is 0.5 seconds so the processing can be performed in a short time.

By in this way selecting an optimal luminescence color for the subject and including it in the command for applying during the actual image capture, a satisfactory image can be easily obtained in consideration of a luminescence color as well as the usual white balance adjustment.

The three types of simplest luminescence color are described here as the warm color, nearly-white color, and cold color; however when there is already illumination of the subject at the party site, etc., the luminescence color can also be changed to a warm color type or cold color type close to the center point of the party site color. By adjusting the white balance to apply a nearly-white color to the party site illumination, an imaging effect can be obtained that is the same as the illumination by natural lighting. Moreover, not only the luminescent color but also the intensity of the illumination light can be adjusted for setting illumination light from the imaging terminal and illumination light from each illumination terminal to the optimal level, to achieve more natural lighting for imaging of a person's face.

EXAMPLE 4

Example 4 describes the grouping of camera-equipped portable terminals comprising the imaging system and their linking operation.

Figure 10:
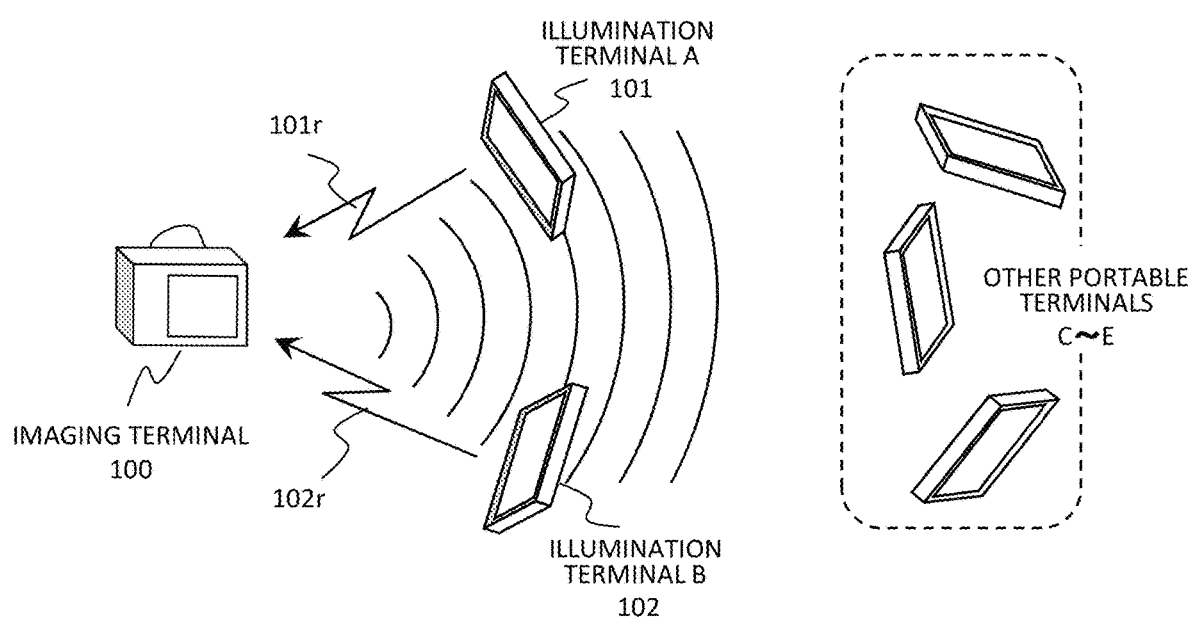
FIG. 10 is a drawing for describing the necessity for grouping the portable terminals (Example 4).

FIG. 10 is a drawing for describing the necessity for grouping the portable terminal. In the imaging system, the imaging terminal 100 sends a command for ordering light emission to the illumination terminal A (101) and illumination terminal B (102) during image capture and to link with the imaging terminal 100 for image capturing. However, besides friends with linkable illumination terminals A and B at the same table at the party site, there are also other persons with portable terminals C, D, and E that not linking operation at adjacent tables, and so these must be separately grouped. Therefore, in order to avoid unwanted effects on other peripheral imaging groups being around, the present example groups the imaging terminal and illumination terminals by authorizing them for linking through mutual communication to utilize them without interference even in environments such as party sites.

In one specific method, at startup of the camera functions or before starting the imaging terminal 100 scans and detects for example SID (Security Identifier) names from wireless LAN for similar neighboring portable terminals, and inquires whether or not mutual linking is possible among the separate SID. Sending back a return signal 101r and 102r that accepts the linking with the imaging terminal 100 by each illumination terminal A and B, serves to authorize and start linking the imaging terminal 100 with the illumination terminals A and B. During the actual image capturing, linked image capture is possible by sending a light emission command signal from imaging terminal 100 to just the authorized illumination terminal A and B. No authorization is carried out for the portable terminals C through E at the adjacent tables so there is no reply even if a light emission command/instruction signal is sent.

Grouping of portable terminals is performed in this way by authorizing the designated portable terminals for lined operation, and the portable terminals can separately perform image capture operation as a group. So there will be no mutual interference even if there are portable terminals of other persons or other imaging groups nearby.

Figure 11:
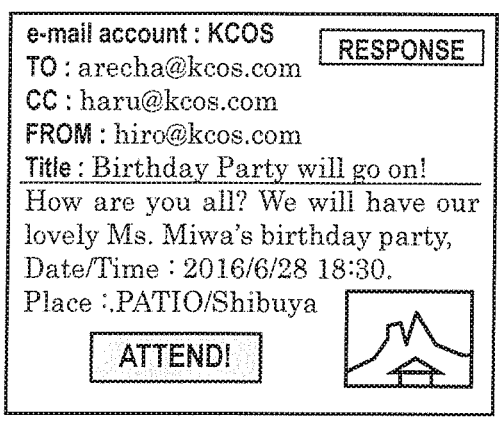
FIGS. 11(a) and 11(b) are drawings showing example of the search method for portable terminals in the target group.
Figure 11:
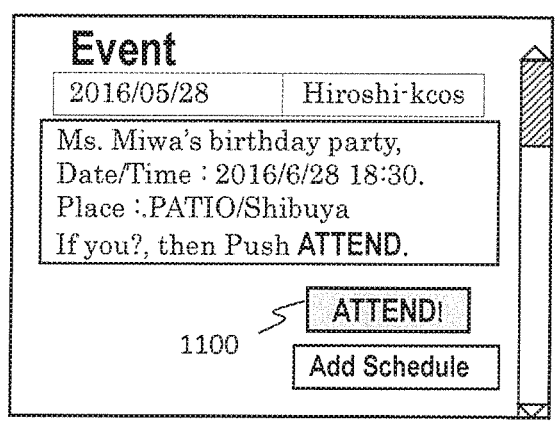

FIG. 11 is drawings showing examples of the search method for the target portable terminals for grouping. In this example, a search is made of persons attending the same party and the portable terminals they possess are grouped (authorized). More specifically, if the information for a designated event such as invitations to a party stored within the portable terminals are a match, those portable terminals are objects for grouping. In the method for searching address book records, mutual acquaintances might be taking part in separate parties while at separate tables and so are not eligible as objects for grouping.

As shown for example in the FIG. 11(a), the portable terminals possessed by persons attending the same party receive special party invitation mail, or the portable terminals contain a schedule for those intending to attend the designated party. Also as shown in FIG. 11(b), by pressing the "ATTEND" button 1100 on the event invitation to the party and sending it back to the sponsor, the event information is in some cases automatically registered in the one's own schedule table. Or, in some cases the ID of the portable terminal of the person planning to attend is authorized by the issuer of the event invitation and sent to the portable terminals of others attending the party. In this way, designated event information is stored within the portable terminal of the party attendees, and by searching that information, the portable terminals belonging to the attendees of the designated party can be detected and grouped even if a large site or location.

Another method is utilizing the NFC function to perform mutual authentication (grouping) by a close proximity touch between terminals when a party is starting at a party site or during image capture. This method may utilize NFC to carry out simultaneous authorization when for example collecting electronic money as a participation fee at the start of a party. Other methods that combine any method for communicating among mutual portable terminals such as wireless, short-distance wireless, and cable, with utilizing information in the portable terminals can be utilized to perform authorization.

Figure 12:
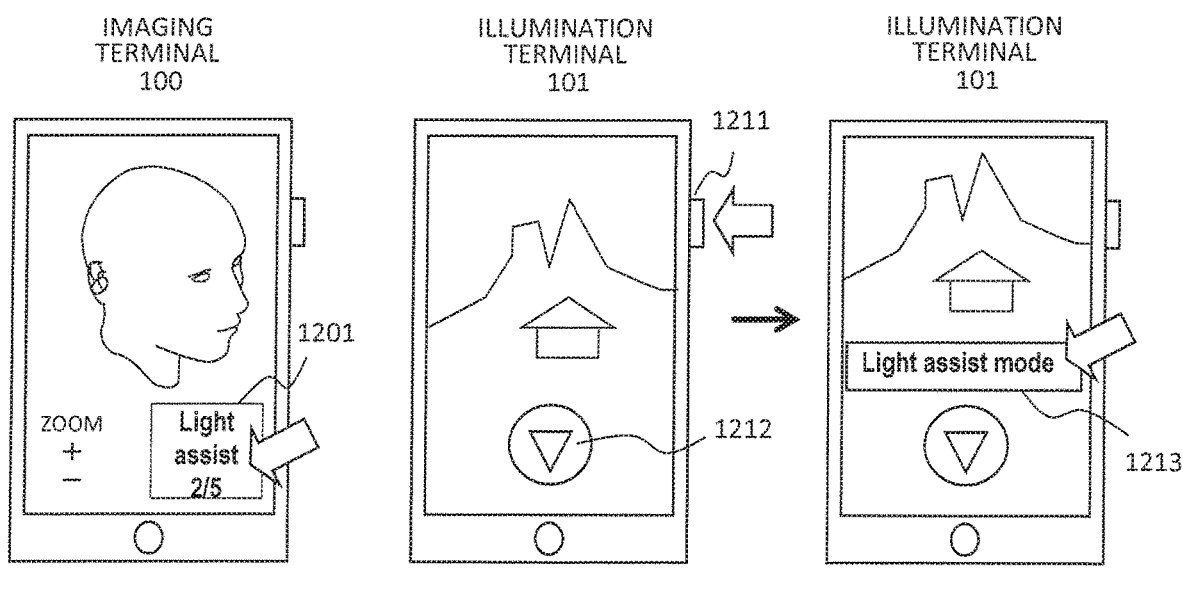
FIGS. 12(a), 12(b), and 12(c) are drawings showing examples of the screen during linked illumination operation between the imaging terminal and illumination terminal.

FIG. 12 is drawings showing examples of the screen during linked illumination operation between the imaging terminal and the illumination terminal. The light emission command from the imaging terminal to the illumination terminal and the linked illumination operation on the illumination terminals are preferably simple enough to allow instantaneous operation when the party becomes lively. The linked illumination operating mode on the illumination terminal is called the "sub-light mode".

The FIG. 12(a) is the screen of the imaging terminal 100 and shows the state in which the camera for image capture has started and further displays button 1201 for making light assist requests described as "Light Assist". By pressing the request button 1201 the photographer sends a request to an authorized illumination terminal to perform illumination operation. Here, "⅖" is displayed on the button 1201, a total of five illumination terminals are pre-registered and this display signifies that two of the five devices have started illumination operation.

The FIG. 12(b) is the screen of the illumination terminal 101 and shows the stand-by state in which the power switch 1211 is pressed and the backlight set to ON or namely a state where the screen is locked. The user operates the slide 1212 to release the lock state and shift to the normal screen allowing operation.

The FIG. 12 (c) is the normal screen of the illumination terminal 101 and shows the agree button 1213 allowing the light assist described in "Light assist mode" in a state receiving light emission commands from the imaging terminal 100. Illumination operation can start just by pressing the agree button 1213 in a simple action that starts the sub-light mode and starts operation as an illumination device. For example it causes full light emission of the backlight LCD on the illumination terminal 101 and turns on the imaging waiting state. The LCD may immediately start emitting light, or may fully emit light for just a period specified in the light emission command signal and set the backlight OFF state (or dim light emission state) for other periods, and in this way conserve electrical power consumption in the illumination terminal.

Normal operation can be restored from the sub-light mode (light emission-image capture waiting state) in the illumination terminal 101 by pressing power key 1211 on illumination terminal 101 to cancel the sub-light mode regardless of image capture operation on the imaging terminal 100. Or, the sub-light mode can be canceled and the LCD and backlight can be turned off, if the light emission command is not received within a specified time $T_{sub}$ or more in sub-light mode. This time $T_{sub}$ can be set by the user and can be set to a longer time than the normal time-out time $T_{out}$ on the portable terminal (for example, $T_{out}$=15 seconds, $T_{sub}$=30 seconds).

FIG. 13 is a drawing and flow charts for describing the grouping of the portable terminals and the communication processing for the linked imaging.

The FIG. 13(a) shows the method for a new portable terminal to participate in an imaging group. The case described here for example is where there are two imaging groups A and B at a party site, and the new portable terminal A2 will participate in group A. In this case, the portable terminal A2 can participate in group A by carrying out communication 1300 with any of the terminals belonging to group A, for example with the portable terminal A1.

Here, proximity communication such as NFC (near field communication) is convenient for communication between the portable terminal A1 and the portable terminal A2. By having each portable terminal user clearly perform a gesture making the portable terminal A1 and the portable terminal A2 physically approach each other, the portable terminals of specially designated users such as acquaintances and party participants can be allowed to reliably and easily participate in a group and other members of the group can be notified.

The FIG. 13(b) shows the communication content and the sequence that the new portable terminal A2 carries out in order to participate in group A, with the portable terminal A1 that previously participated in group A. The new portable terminal A2 sends a terminal ID for the portable terminal A2 to the portable terminal A1 by communication through manual user operation or the near field communication function (S1301). The portable terminal A1 that receives the portable ID, sends a group request to the portable terminal A2 and inquires whether the portable terminal A2 intends to participate in group A (S1302). The portable terminal A2 that receives the group request, decides to accept the group request, and sends a reply to the transmit source portable terminal A1 expressing the intent to participate (S1303). The portable terminal A1 adds the terminal ID of the new portable terminal A2 to the group list (S1304), next, distributes the updated group list to each member already participating in group A including the portable terminal A2, or distributes) just the changed portion (S1305). This group list is generated at the stage where two portable terminals are first formed into a group. From here onwards, any of the portable terminals belonging to the group can send a group request to a newly participating portable terminal.

Figure 13C:
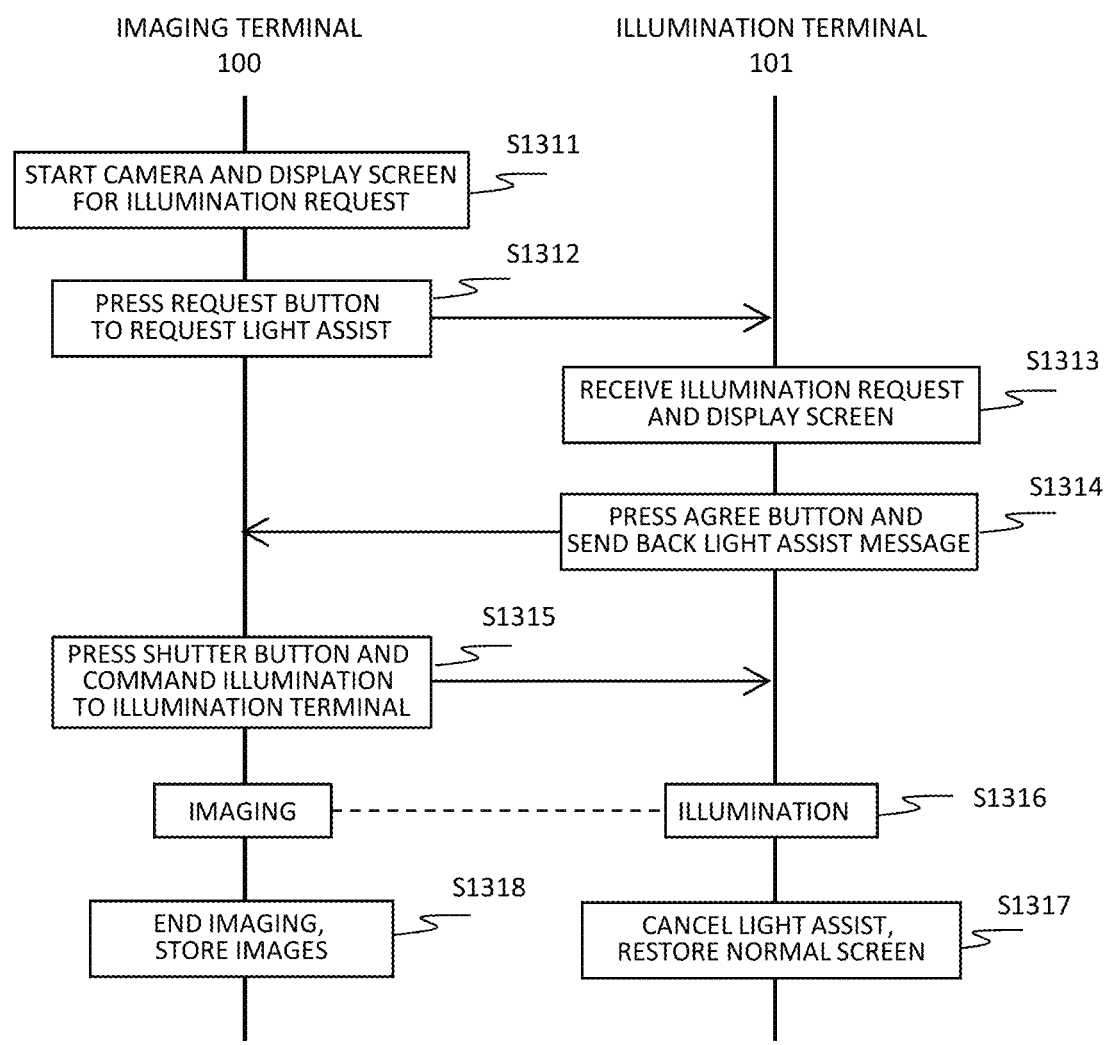

The FIG. 13(c) shows the communication content and the sequence carried out when the imaging terminal 100 and the illumination terminal 101 link and perform image capture operation. This communication content and sequence correspond to the image operation in FIG. 12 and a description is given while referring to this Figure. Here, the description only covers one illumination terminal 101 for purposes of simplification but the case is the same as when including plural illumination terminals.

First of all, when the imaging terminal 100 starts the camera, a button requesting illumination to the other portable terminal (1201 in FIG. 12(a)) appears (S1311). When the user presses the request button 1201, a communication requesting light assist is sent from the imaging terminal 100 to the portable terminal (illumination terminal) 101 belonging to the group (S1312). The request for light assist from the imaging terminal 100 may be automatically sent along with camera start-up and in that case the operation using the request button 1201 may be omitted.

The illumination terminal 101 that receives the illumination request, displays a screen showing the illumination request from the imaging terminal 100 superimposed on the top display such as the usual standby screen (or when a separate application has started, on that application screen). A button to accept receiving the illumination request is displayed on this screen (1213 of FIG. 12(c)) (S1313). Pressing this agree button 1213 by the user sends back a message for approving light assist from the illumination terminal 101 to the imaging terminal 100 (S1314).

The portable terminal 100 that receives this return message faces the camera to the subject and shifts to the image capturing mode. The illumination terminal 101 on the other hand, turns on (lights up) the LCD display (or flash for image capture) and shifts to sub-light mode capable of illuminating the subject. The user of the illumination terminal 101 faces that terminal toward the subject as shown in FIG. 1 or FIG. 8, and adjusts an illumination position etc. so as to perform satisfactory light assist.

Then, pressing down the shutter button on the imaging terminal 100 simultaneously sends an illumination command to the illumination terminal 101 (S1315). More specifically, a light emission command signal 300, or a light emission command signal 310 including a command to perform illumination control is sent. The illumination terminal 101 in this way performs illumination in compliance with this command at the instant the imaging terminal 100 performs imaging (S1316). When image capture ends, the illumination terminal 101 cancels sub-light mode and restores the usual standby screen (or the application screen operating prior to illumination) (S1317). In parallel with this operation, the imaging terminal 100 ends the image capture and stores the captured images in the memory (S1318).

The above described group list is deleted from each portable terminal at the time the party ends or there is no longer any communication from portable terminal ID of the same group; and ends the linked relation between illumination terminals or imaging terminals at the party. Therefore, the group list does not include any indefinite information.

FIG. 14 is drawings for specifically describing the communication method using the schedule data and mail held by the portable terminal as shown in FIG. 11.

The FIG. 14(*a*) shows the method for generating the character code (hereafter called schedule code) 1400 usable for mutual authorization by making use of party announcement mail and schedule data retained in each portable terminal. The schedule code 1400 is comprised of a packet that utilizes a portion of the main mail text and is a consecutive array containing a transmit terminal ID and event date, number of characters indicating and specifying a portion of the text, and specified character number code. The specified character number code is the main text sub-divided into four bytes each, with a total of nine 4-byte character strings (36-character portion) among which the lower four bytes are the character code number total. The schedule code is generated based on the mail text (section shown in italic and bold characters) which is an invitation to a particular party and contains information on the designated event.

The FIG. 14(*b*) shows the communication content and the sequence when grouping by utilizing this schedule code 1400. Targets for grouping are selected using the schedule code of the portable terminal (users) attending the same party and allowing them participate in the group. The communication content between the portable terminal A1 already participating in group A and the portable terminal A2 newly participating in group A is shown.

The portable terminal A2 sends a terminal ID for portable terminal A2 to the portable terminal A1 by manual user operation and by using the near field communication function (S1401). The portable terminal A1 that receives the portable ID, sends a schedule code 1400 within the portable terminal A1 that was generated in FIG. 14(*a*) in addition to the group request, and inquires whether the portable terminal A2 intends to participate in group A or not (S1402). The portable terminal A2 that receives the group request generates the schedule code within A2 in the same way, from mail and schedule data stored within its own device and within the received A1 schedule code. The portable terminal A2 checks that the schedule code matches the schedule code within A1 (S1403). By collating the schedule code of both parties in this way, the portable terminal A1 that sends the group request can be authorized so that the portable terminal is known as attending the same party and is not an unknown portable terminal. The portable terminal A2 then generates a schedule code within A2 by the same method that is shown in FIG. 14(*a*) by this time setting a separate number of characters and sends back a message attached with the generated code showing the intent to allow participation in group A (S1404).

The portable terminal A1 receives the schedule code within A2 and the group participation acceptance that was sent from the portable terminal A2, generates and collates a code with a specified number of characters from the received schedule code within A2, and authorizes the portable terminal A2 as a portable terminal attending the same party (S1405). The portable terminal A1 then adds the portable ID of portable terminal A2 to the group list, and sends the group participation permission to the portable terminal A2 (S1406). The portable terminal A1 also distributes an updated group list to each member that is already participating, or distributes the differing portion of the list. The portable terminal A2 receives the group participation permission and displays it on the schedule screen (S1407).

By applying this method, the mail and schedule data can be converted into a simple code, and a portable terminal to hold shared event information can be selected and authorized without disclosing personal information contained within the mail and schedule data.

When first sending the portable ID to the portable terminal A1 from the portable terminal A2 in S1401, if included along with the schedule code, then both can be collated when first sending them.

When results from the authorization in S1405 reveal that the new portable terminal (here, A2') is not the portable terminal attending the same party, the ID of the portable terminal A2' may be distributed to the members within group A the same as the group list. Distributing the ID of the portable terminal A2' to the member within group A is allowable because even if the terminal ID of the portable terminal A2' is later sent to another portable terminal within the group, the portable terminal that receives the ID can swiftly judge that portable terminal A2' is not a portable terminal attending the same party so that subsequently generating a code and communicating the code is unnecessary.

EXAMPLE 5

Example 5 describes a method to shorten the waiting time required at the illumination terminal before starting image capture when the imaging terminal and the illumination terminal are linked to perform image capture. Namely, Example 5 proposes a method to efficiently connect and communicate taking into consideration the communication environment with the imaging terminal and the illumination terminal.

The imaging terminal and the illumination terminal may communicate with each other for example by utilizing wireless LAN however these portable terminals already utilize wireless LAN for ordinary Internet connections. The SID check in FIG. 10 is carried out in this state but from the start of the party onwards, or from the start of image capture to the end of image capture the portable terminals carry out communication directly with each other, and not all of the portable terminals are necessarily present in the LAN space for connecting to the Internet at that time. So when carrying out communication directly with a wireless LAN such as when performing authorization during the start of the party, the portable terminal that is the host acts as a router and distributes IP addresses to the portable terminals of the persons attending the party, and thus allows direct communication between portable terminals. However, when the each portable terminal operates under the router of the portable terminal serving as the host at the start of the party, the need arises for making Internet connections by way of the portable terminal serving as the host, and so the communication capacity of the portable terminal serving as the host might possibly exert effects on the Internet communication speed of each portable terminal.

Whereupon, in order to allow communication between portable terminals authenticated for example just for the period during image capture, one method gives commands for operation as illumination terminals after the portable terminal serving as the imaging terminal functioning as a router, distributes IP addresses to portable terminals that were temporarily pre-authorized.

This example illustrates a method for making sequential one-to-one connections each time the imaging terminal communicates with the illumination terminal, and commands it to start operating as an illumination terminal, and further when the shutter button is pressed makes sequential one-to-one connections again to send the light emission time and other information from the imaging terminal to the illumination terminal. In this case, not only a wireless LAN but also Bluetooth may be utilized for communication.

In cases where the imaging terminal and the plural illumination terminals are simultaneously connecting or carrying out one-to-many broadcast type communications, then for example sending of information such as light emission times or illumination terminal ID, and option information as communication information shown in FIG. 4 can be carried out within an extremely short time in Mbps units. However, when carrying out one-to-one communication between the imaging terminal and the illumination terminal, besides the time needed for information communication between the imaging terminal and illumination terminal, the time required for setting up communication and the time required for cancelling the communication for each illumination terminal is also added. The total of all these times multiplied by the total number of illumination terminals is the time that the information communication requires so image capture will not start immediately just by pressing the shutter button.

Generally therefore, when taking a souvenir picture with a person as the subject, an image capture scheme is employed that carries out the actual image capture by performing a count-down and carrying out information communication from the imaging terminal to each illumination terminal during the count-down. Restated, the countdown time is utilized to secure the time needed to prepare for the linked illumination.

Figure 15:
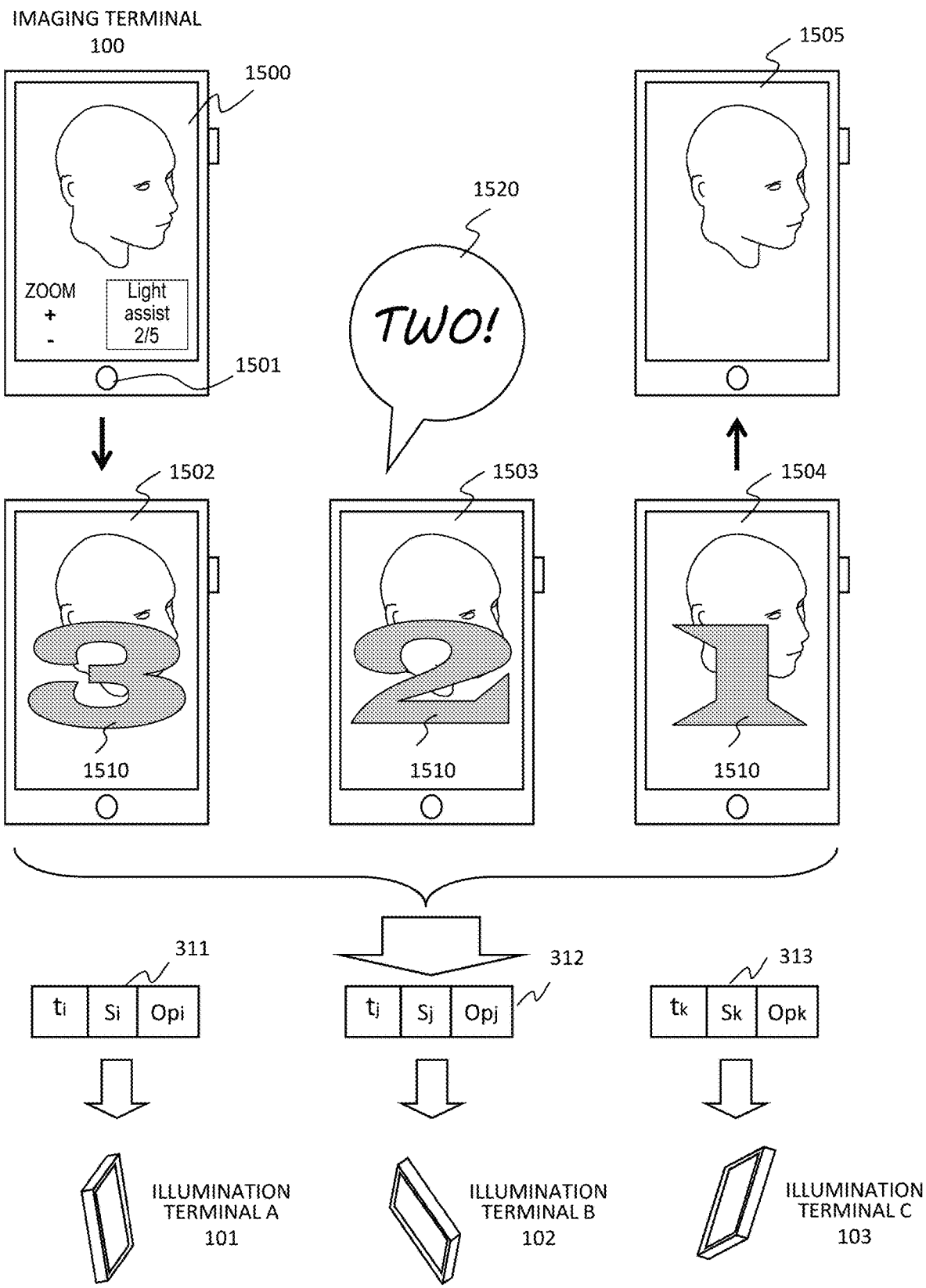
FIG. 15 is a drawing for describing the method for imaging that utilizes a count-down (Example 5).

FIG. 15 is a drawing for describing the method for image capture that utilizes a countdown. The imaging system is comprised of the imaging terminal 100, and three illumination terminals A (101), B (102), and C (103).

The framing of a person serving as the subject is being performed on the screen 1500 on the imaging terminal 100. Here, pressing down the shutter button 1501 performs image capture but this example is rendered so that the actual image capture is performed after a specified period of time elapses such as by way of a self-timer after pressing the shutter button to secure time for communication with the plural illumination terminals A, B, and C.

More specifically, performing the framing of the subject and operating the shutter button 1501 on the imaging terminal 100, cause the imaging terminal 100 to send the light emission command signals 311, 312, and 313 in the format described in FIG. 3(b), to the illumination terminal A, B, and C. The communication for sending of the command signals is first of all setup between the imaging terminal and each illumination terminal and the light emission command signal next sent, and the communication is then canceled. This operation is carried out on the three illumination terminals.

If the imaging terminal 100 could be constantly connected between the illumination terminals A, B, and C by a communication method such as WiFi, setting up communication and canceling communication would not be necessary. However, making a connection even on the same WiFi using methods such as Bluetooth and ad hoc type one-to-one connections means that the imaging terminal and illumination terminal can only make a one-to-one connection. Therefore, in order to connect to plural illumination terminals, a communication setup and a communication cancellation must be made in sequence with each illumination terminal so that approximately one second is required for one unit which is a very long time overall.

In the present example, a countdown value 1510 appears as, "3" "2" "1" on the screen of the imaging terminal 100 when carrying out communication with each illumination terminal. Namely, there is a transition of countdown screens as 1502, 1503, 1504, and image capture is performed when the countdown value reaches "0" on countdown screen 1505. In parallel with this operation, the internal speaker in the imaging terminal 100 outputs a "3" "2" "1" voice 1520 countdown.

Plural countdown voices are preset inside the imaging terminal 100, an optional voice may be preselected, or a different countdown voice may be downloaded from a network. Further, even the user's own voice may be directly recorded and utilized as the countdown voice.

Applying this countdown operation in this way allows securing communication time so that the illumination terminal user does not have to spend unnecessary time for waiting and the user can moreover make efficient use of this waiting time.

This kind of countdown is generally utilized when capturing images of persons such as in group photographs and is typically used to take good quality photographs of persons so they do not shut their eyes at the instant of capturing the image or can present their best facial expression during image capture, etc. Also, in recent years the cameras inside portable terminals even include a mode for taking one's own picture and the countdown mode is utilized in the same way, with the photographer (person serving as the subject) allowed time after pressing the shutter button for preparing to face the camera in the best direction to capture an image just as when photographing a person. The user will therefore feel no reluctance in employing a countdown in the image capturing of this example.

Figure 16:
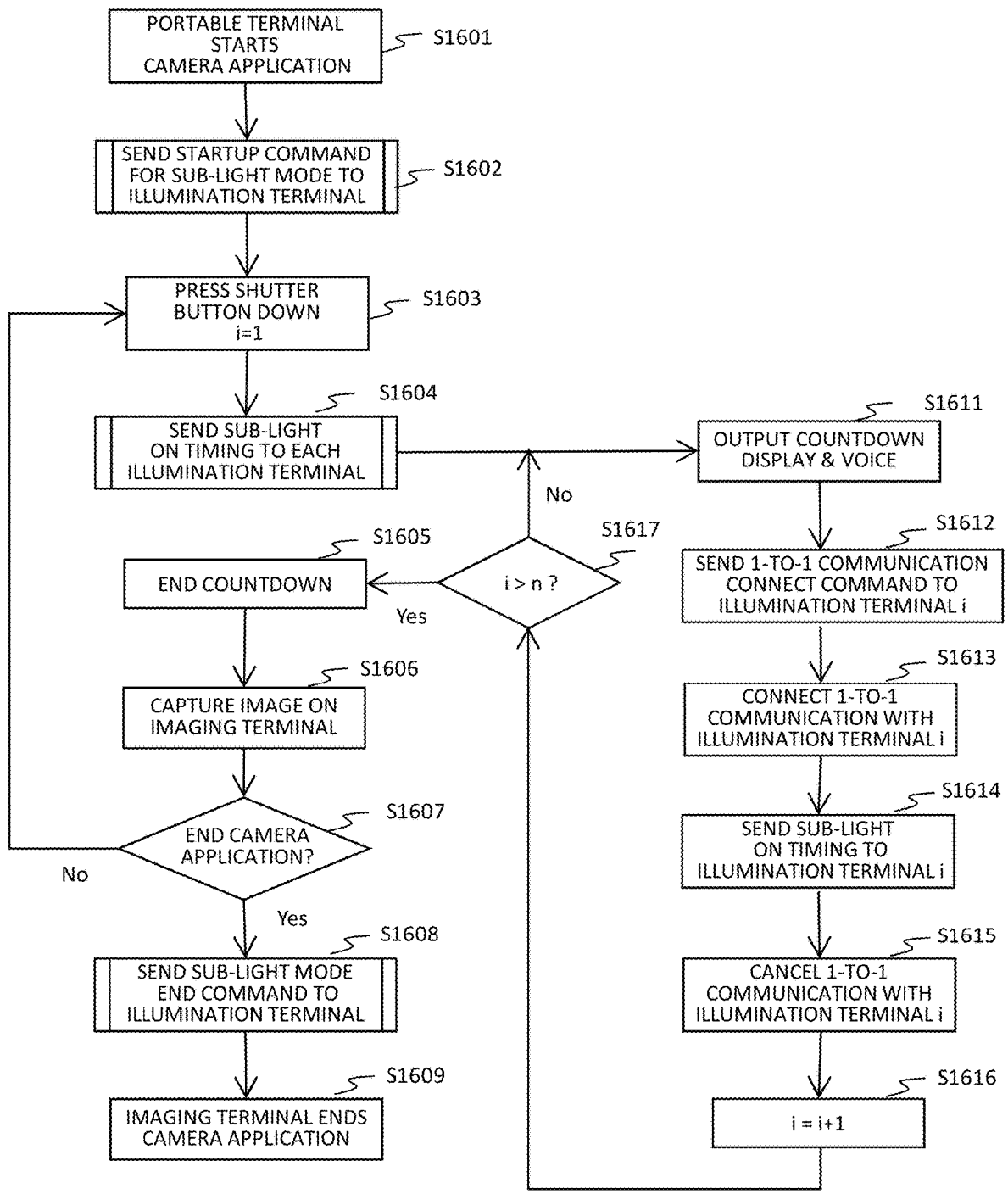
FIG. 16 is a flow chart showing the processing flow when imaging that utilizes a count-down.

FIG. 16 is a flow chart showing the processing flow when imaging that utilizes a count-down. Here, imaging is performed based on the light assist from each illumination terminal after sending commands to each of the terminal units, including a total of n number of illumination terminals. Hereafter, this function to perform imaging based on light assist is called the "sub-light" mode.

The user first of all starts up the camera application on the imaging terminal 100 and specifies the sub-light mode utilizing light assist for other portable terminals (S1601). Next, the user sends a startup command for sub-light mode for having each illumination terminal within the group perform light assist (S1602).

The imaging terminal user presses the shutter button for image capture and as the initial setting, here, 1 is substituted into the variable i for counting the number of illumination terminal units (S1603). The sub-light ON timing is then sent to each illumination terminal (S1604).

Along with a countdown, the processing in S1604 is specifically performed as follows. First of all, the countdown display 1510 and the voice 1520 shown in FIG. 15 are output (S1611), a one-to-one communication connection command is sent to the illumination terminal i (S1612), and a one-to-one communication setup is curried out between the illumination terminal i and the imaging terminal (S1613). Next, the sub-light ON timing command 311 through 313 is sent to the illumination terminal i (S1614) and the one-to-one communication setup with the illumination terminal i is cancelled (S1615). Then, after adding 1 to variable i for counting the illumination terminals, the operation proceeds to the communication process for the next illumination terminal (S1616). The sub-light ON timing is in this way sent to one illumination terminal i unit at a time, and this operation repeats until the variable i reaches n number of illumination terminal units (S1617).

When the decision in S1617 is that n of variable i is exceeded, the countdown is ended (S1605), and the imaging terminal 100 operates the camera to capture image (S1606). Each illumination terminal carries out sub-light ON operation to match the image capture timing. This image capturing by the imaging terminal continues until the camera application ends, and each illumination terminal operating up to that time, continues to illuminate the subject in a state with the illumination function in operation.

After the image capturing, the imaging terminal 100 decides whether to end the camera application or not (S1607), returns to S1603 if continuing image capture, and repeatedly performs subsequent processing with the shutter button pressed down. When the camera application ends, or namely the image capture ends, a command is made to end the sub-light mode on each illumination terminal (S1608), and the imaging terminal 100 ends the camera application operation (S1609).

Here, when separately sending commands to each illumination terminal in the sub-light mode start command (S1602) and the sub-light mode end command (S1608), the communication setup may be separately sent by using the same procedure as in the procedures (S1612 through S1615) for sending the sub-light ON timing to each illumination terminal. Or, the sub-light mode startup and end commands may all be carried out together by broadcast communication to each portable terminal within the group.

The portable terminal of the present example serving as the illumination terminal keeps the Internet connection cutoff time for communication with the imaging device to a minimum, and performs the countdown operations in parallel with the communication time with the imaging device so that there is no unnecessary waiting time for the user.

EXAMPLE 6

Example 6 describes an arrangement for sharing the captured images among the members in the group. Here, the group refers to a state capable of mutual communication within a local area. In this way, an image captured by one camera-equipped portable information terminal device (portable terminal) belonging to the group can be easily shared and viewed among members within the group by swiftly disclosing and distributing (hereafter, called "sharing") the image to each portable terminal within the group. For example, among the portable terminals belonging to users participating in an event at a common location, a group is formed at the location. And afterwards for example, the still image data such as the image data captured at that location as well as the data including other audio, video, and documents are distributed to each member within the group.

Figure 17A:
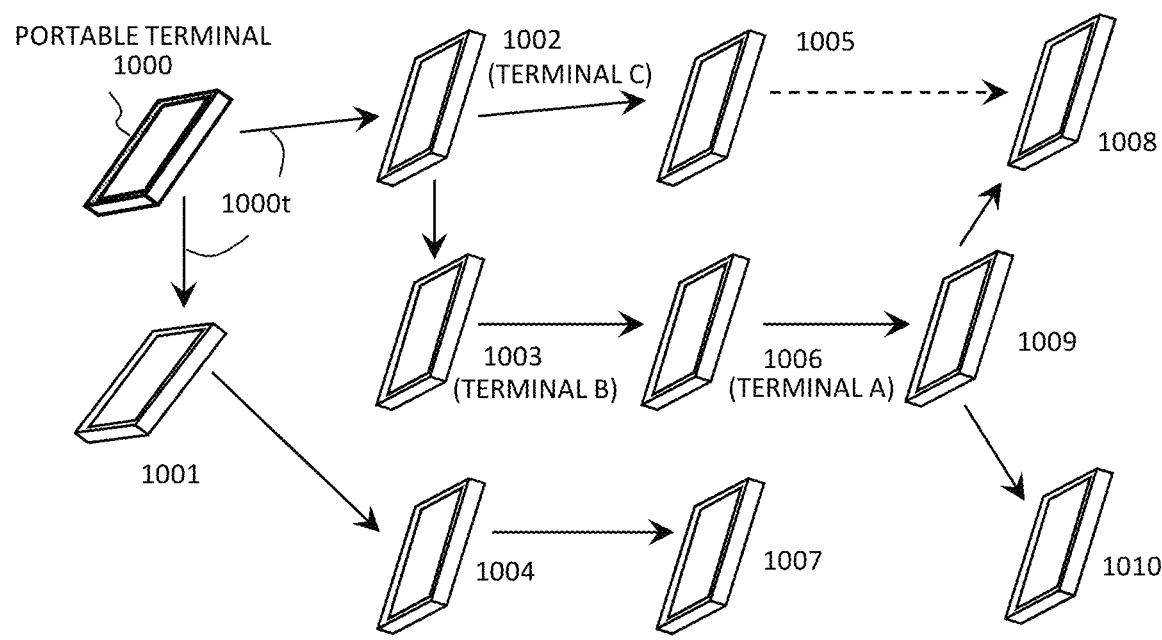
FIG. 17A is a concept image drawing showing the communication path when the portable terminal participates in the group (Example 6).
Figure 17B:
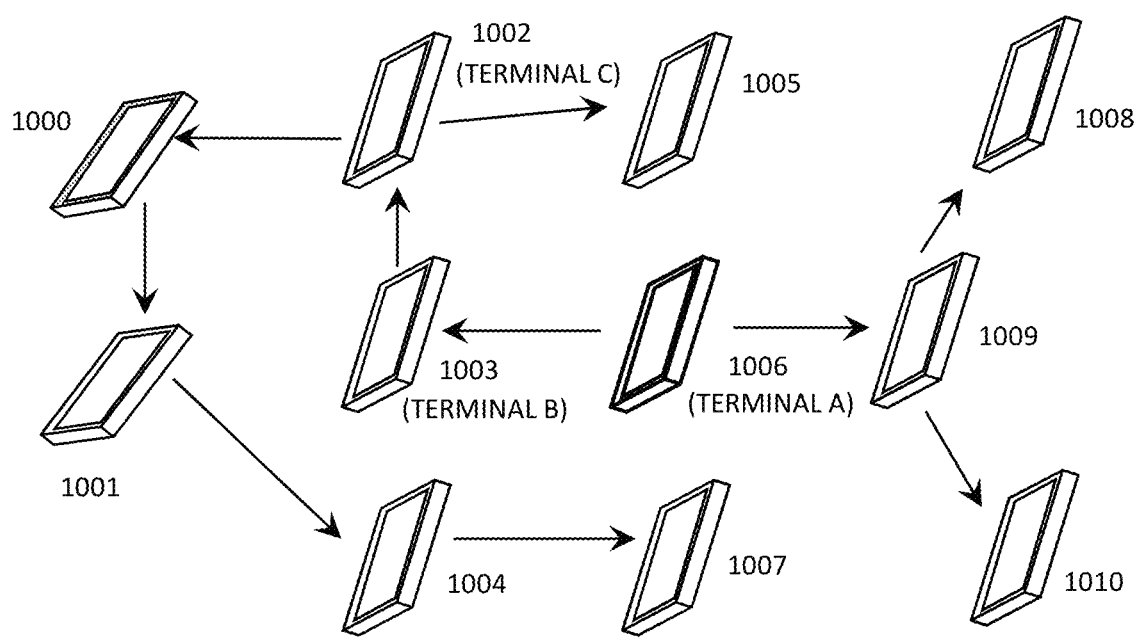
FIG. 17B is a concept image drawing showing the path for sharing the image from the portable terminal within the group.

FIG. 17A and FIG. 17B are concept image drawings for describing the path for grouping the portable terminals and the path for sharing images.

FIG. 17A is a drawing showing the communication path when the portable terminal participates in the group. First, the portable terminal 1000 for example performs grouping operation of the portable terminals in the communication 1000t arrows, and first of all makes the portable terminals 1001 and 1002 participate in the group. In that case, the portable terminal 1000 performing grouping operation is called the "Group Parent" and the portable terminals 1001 and 1002 participating in the group are called the "Group Child". In this way, a state is reached where the portable terminals 1000, 1001, and 1002 participate in the same group, and the portable ID data (group list) for the three portable terminal units are stored in these three portable terminal units.

Next, when grouping a new portable terminal 1005, a communication is not always necessarily required with the portable terminal 1000, and grouping can be performed by communicating with portable terminal 1002 within the group as the group parent. At that time, the portable terminal 1002 serving as the group parent, adds the terminal ID of the newly participating portable terminal 1005 to the group list, and sends that group list to the portable terminal 1000 which is its own group parent. Further, the portable terminal 1000 sends the group list received from the portable terminal 1002 to the portable terminal 1001 which is its own group child. The portable terminal 1001 stores the received group list by overwriting it onto the original list. The portable terminal 1000 can in this way know the portable ID of the portable terminal 1005 that is newly participating in the group.

This process continues further, the portable terminal 1002 allows 1003 to participate in the group; the portable terminal 1003 allows 1006 to participate in the group; and the portable terminal 1001 allows 1004 to participate in the group to enlarge the group structure in this way. One group containing the portable terminals 1000 through 1010 is consequently formed, and each portable terminal is capable of sharing the terminal ID (group list) of each portable terminal belonging to the group.

Here, the data exchange between portable terminals within the group is carried out between the group parent and the group child. The portable terminal 1006 (terminal A) for example allows the portable terminal 1003 (terminal B) as the group parent to participate in the group so that the terminal ID of portable terminal 1006 is registered in the group list but the data exchange is carried out with the portable terminal 1003. The portable terminal 1003 (terminal B) in the same way, carries out data exchange with the portable terminal 1002 (terminal C). Device information within each portable terminal is in this way placed only in the terminal ID disclosed within the group, and the dissemination of other personal information and the addition of communication traffic can be prevented.

After the portable terminal 1008 participates with the portable terminal 1009 as the group parent and before the group list where the portable terminal 1008 is registered is distributed within the group, a communication 1005t for allowing participation of the portable terminal 1008 from another portable terminal 1005 may likely be received at the portable terminal 1008. In such a case, in order to prevent redundant group registration, a message is sent back to the portable terminal 1005 that the portable terminal 1008 is already registered in the same group. At this time, the portable terminal 1008 may overwrite information showing the link interrelation from the group participation processing from 1005, for inquiries to portable terminal 1005 and 1008 users and according to the level for "friend" and "good friend" such as for SNS (Social Network Service) or address notebooks within each of the devices.

FIG. 17B is a concept image drawing showing the path for sharing the image from the portable terminal within the group. Here, the disclosing or distributing (sharing) of images captured by portable terminal 1006 (terminal A) is described.

As shown in FIG. 17A, link information (group parent and group child connection information) among each portable terminal within the group need not be shared among all the portable terminals, and just link information showing which portable terminal is communicated with when one's own device participates in the group, or in other words just information showing the relation of one's own group parent and group child is stored within each portable terminal. Therefore, the portable terminal 1006 sends a captured image to the portable terminal 1003 (terminal B) serving as the group parent and to the portable terminal 1009 serving as the group child. Each portable terminal that receives this image, in the same way sends the received image to the portable terminal serving as the group parent and the portable terminal serving as the group child. The image can consequently be distributed to all portable terminals within the group. In that case, the direction for sending to the portable terminal that is the group parent is the terminal A→terminal B→terminal C direction; and opposite the communication direction (direction of the arrow) for participating in the group in FIG. 17A.

Besides the image data itself, the data to send may include information specifying file names and addresses for storage within the portable terminal 1006 that is the transmit source. Or, for each portable terminal or at the point in time that grouping is performed, a method may be used for sending image data defined by the portable terminal 1000 on a cloud not shown in the drawing or that address may be shared.

Figure 18A:
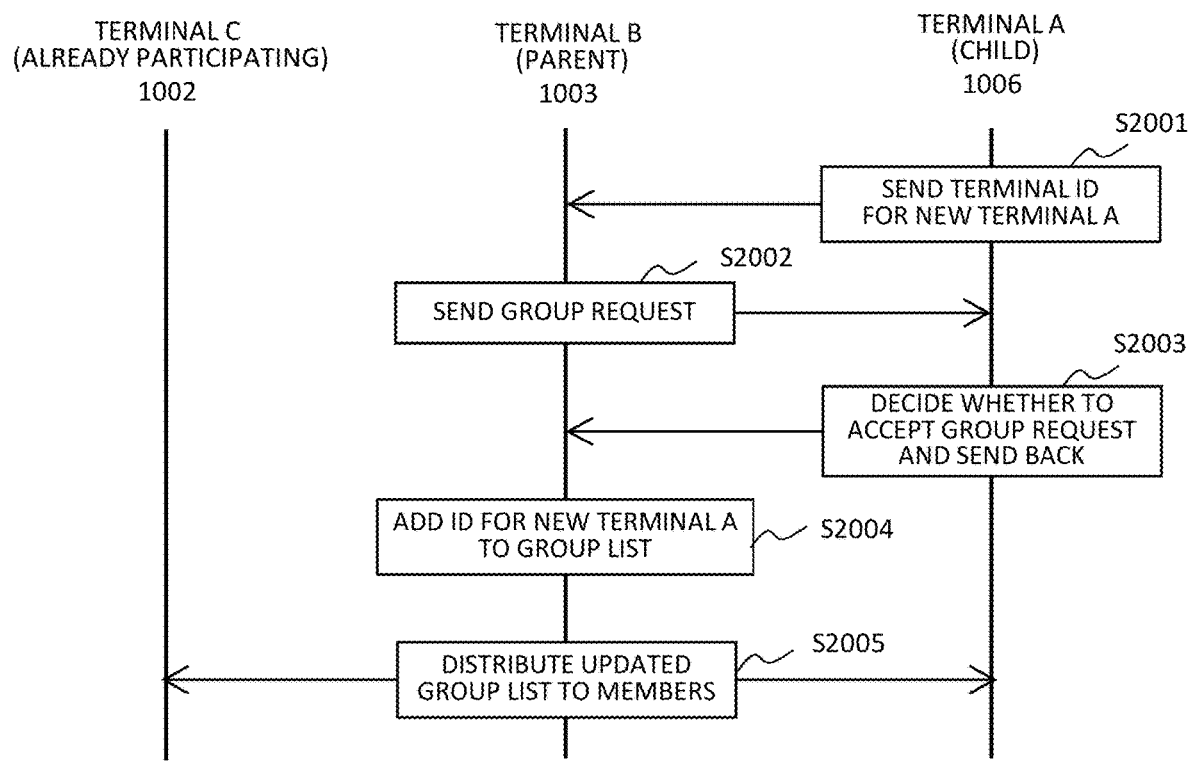
FIG. 18A is a flow chart showing the processing when the portable terminal participates in the group.

FIGS. 18A through 18C are flow charts showing the processing procedure for participating in the group and sending images, and the group cancellation. Here, the processing for the portable terminal 1006 (terminal A) to participate in the group, and the processing for sending an image captured by the terminal A to another portable terminal 1002 (terminal C) in the group by way of the portable terminal 1003 (terminal B) are described based on the examples in FIGS. 17A and 17B. Further, the processing for the terminal A to withdraw from the group is also described. The terminal A and the terminal B, the terminal B and the terminal C, are in a mutual group parent-child relationship as previously described.

FIG. 18A is a drawing showing the process when the portable terminal participates in the group. The terminal A (1006) sends a terminal ID of the terminal A to the terminal B (1003) that is already participating in the group (S2001) by communication by way of manual operation of the near field function by the user. The terminal B receiving the terminal ID, sends a group request to the terminal A, and inquires whether the terminal A intends to participate in the group or not (S2002). The terminal A that receives the group request, decides to accept the group request, and returns a message to participate in the group to the terminal B that is the transmission source (S2003). The terminal B adds the terminal ID of the terminal A to the group list (S2004), and next distributes the updated group list to the terminal A, and to the terminal C already participating in the group (S2005). From here onwards, the terminal A newly participating in the group, can also perform the procedure for having a new terminal participate in the group, the same as allowed for the terminal B.

Methods other than the above are also capable of having a portable terminal participate in a group. The portable terminal for example can communicate with a portable terminal already participating in the group, by the placing of one terminal on another utilizing non-contact short-range communication such as NFC (Near Field Communication) to perform group participation processing. The name of a portable terminal may be selected and grouping performed when there are plural portable terminals placed within a common network environment by the same method. Also, the mail screen shown in FIG. 14, or the numeric coding shown on that screen and further a specified image including two-dimensional barcode may be displayed on the screen of a portable terminal already participating in the group, and that image is captured by the camera of a new portable terminal to be authorized the participation in a group.

FIG. 18B shows the processing for sending an image from the portable terminal. In this case as shown in FIG. 17B, an image from terminal A (1006) is sent to terminal B (1003) in a direction opposite the group participation processing direction and further forwarded to the terminal C (1002).

The terminal A selects the captured image or an image the terminal A wants to share (S2011) and sends a command for communication connection to terminal B which is the group parent (S2012). The terminal B carries out communication connection processing (S2013), and when the terminal A and the terminal B are in a connected communication state, the terminal A sends image data (S2014), and the terminal B receives that image data (S2015). Both the terminals A and B subsequently cancel that connection (S2016).

The terminal B that receives the image data, executes a communication connection command with the terminal C that is its own group parent (S2017), and sends (forwards) image data by the same procedure as described above (S2018 through S2021). This same action is carried out for all terminals belonging to the group and the image from the terminal A is forwarded by the relay system, allowing sharing with all terminals belonging to the group.

Here, the image data is sent by the relay system by portable terminals in a mutual group parent-child relationship. The load from sending the data can in this way be apportioned among each terminal and the image data can be instantly and efficiently distributed to all terminals. The terminal A that carries out the image capture may of course send the image data directly to all terminals belonging to the group. Or, may for example send the image data by broadcast transmission utilizing a method such as mail; however when there are a large number of terminals belonging to the group, the load increases on the terminal A which is the transmit source.

The image data from the terminal A may be stored on a network and the image data that is stored may be loaded in a state allowing access by a terminal belonging to the group. Further, the captured image may be uploaded to the cloud (network storage) and that address sent to each terminal according to the flow in the flowchart. This method is effective when not in a hurry to view the captured image.

The group cancellation is described next. The group in which each portable terminal participates is cancelled after a specified duration period elapses. In other words, the group duration period only lasts for the time zone of the event described in the mail and the schedule information shown for example in FIG. 11, and the group is automatically cancelled after the event ends. Automatically cancelling a group may employ a method that communicates information showing that the group is cancelled, among each terminal; and a method that cancels the group by having each terminal separate from the group voluntarily, according to the schedule. Further, the entire group may be cancelled by operation of an optional terminal within the group (for example, the terminal of the organizer of the party). Each terminal user on the other hand may voluntarily operate their terminal to separate from the group.

FIG. 18C shows the processing for the portable terminal to separate from the group. The process for the user of terminal A (1006) to separately withdraw from the group in order to leave the ongoing party is described.

The terminal A first of all sends a request showing intent to withdraw from the group to the terminal B which is the group parent (S2031). The terminal B that receives the request, displays the request to withdraw from the group on the terminal screen and notifies the user (S2032). If necessary, the notification may be combined with vibrator operation or an incoming message voice. When the terminal B user sees the displayed withdraw request and operates (the device) to accept the request, a message accepting the withdraw request is sent back from the terminal B to the terminal A (S2033). The terminal B then deletes the ID of the terminal A from the group list (S2034) and distributes an updated group list to the terminal C (S2035). The terminal C further distributes the group list no longer including terminal A to each terminal within the group by forwarding the updated group list to the other terminals.

In S2033, when the user of terminal B decides whether or not to withdraw from the group, an operation to select not permitting withdraw from the group is also possible. In that case, notification is made that the withdraw request is not accepted and the processing ends. If there are no particular conditions on group participation or withdraw, the terminal B may automatically decide on withdraw (acceptance) without a decision from the user and the operation proceeds to the next process. Also, even in the case of automatic processing by terminal B, withdraw of the terminal A may be notified to all terminals within the group by a combination with a screen display or voice/vibration.

FIG. 19 is drawings showing the operating screens for sending the image from the portable terminal. This is for example when sending the image captured by terminal A (1006) to the terminal B (1003).

The FIG. 19(a) shows the screen 1700 of terminal A during image capture, and the subject is displayed in the finder. The software button 1700 in the screen is the same as the light assist request button 1201 described in FIG. 12. In this imaging mode, pressing the shutter button 1702 captures a still image of the video displayed in the finder and stores the still image in the memory.

The FIG. 19(b) shows the screen 1700' after image capture and shows the still image captured in FIG. 19(a). The image displayed here is the image immediately after image capture but a stored image in the memory loaded from the memory can of course also be displayed. Two software buttons 1703 and 1704 are displayed in the screen. The button 1703 that shows, "Next Take" is for continuing to capture images and pressing this button 1703 again shows the FIG. 19(a) screen display.

The button 1704 displaying "Send to Group" on the other hand, is for sending images. Pressing the send button 1704 automatically makes a communication connection with a preset terminal (for example, terminal B) and sends the captured image. After performing the send operation, the process again returns to the screen 1700 of FIG. 19(a), and image capture can continue. Pressing the home button 1705 ends the image capture mode. The user can in this way send images to members within the group by way of a simple operation.

Example 6 can in this way promptly distribute the captured images to portable terminals belonging to the group, and the group members can instantly view the captured images.

EXAMPLE 7

Example 7 describes a method for managing the captured image data. The image data is data captured by the user's own device, and there are also items received from other portable terminals within the group so these are respectively classified and saved.

Figure 20:
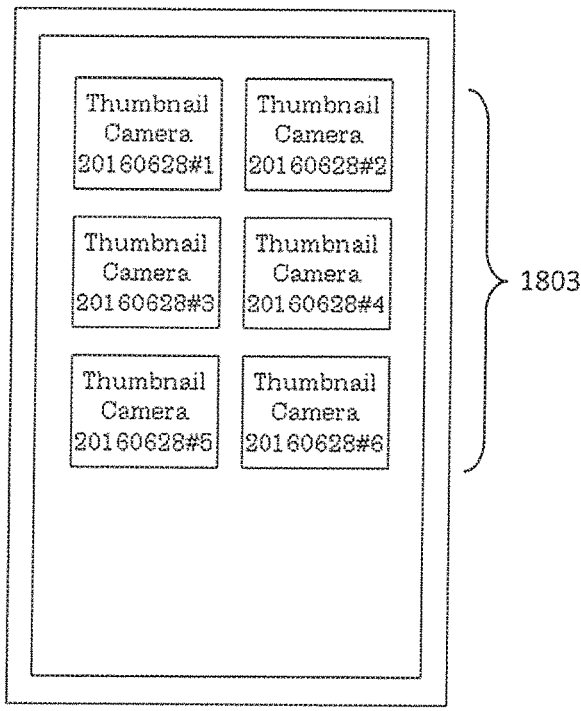
FIGS. 20(a), 20(b), and 20(c) are drawings showing the method for managing the image data in the portable terminal (Example 7).
Figure 20:
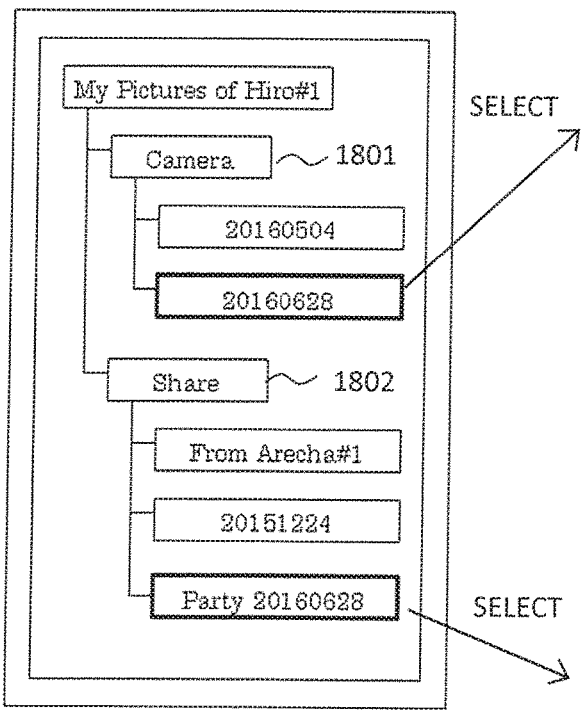
Figure 20:
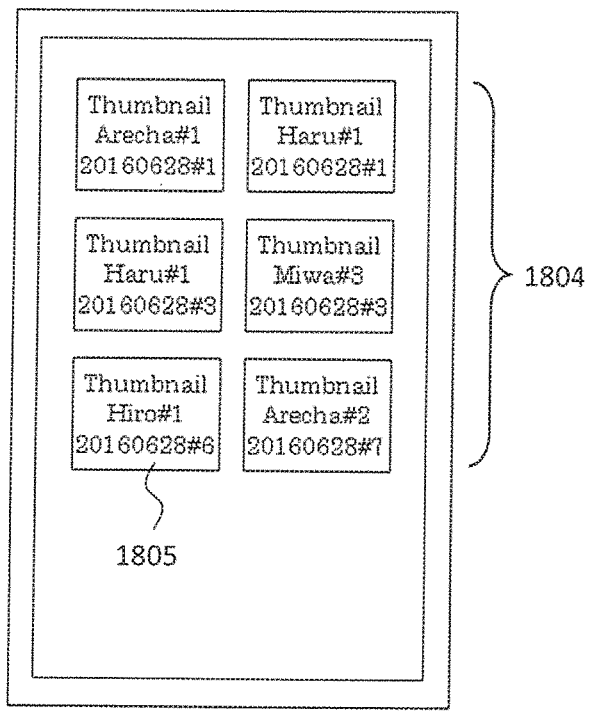

FIG. 20 is screen examples showing the method for managing the image data in the portable terminal. The display screen 1800 is configured by superimposing a color display panel such as liquid crystal display panel capable of displaying the captured image and a touch panel that outputs those coordinates on the screen when the display screen is touched. The user can in this way view the captured image, and by touching the menu screen, switch the image display according to the selected menu.

The FIG. 20(a) is a screen showing the configuration example of the folder for managing the image files. Here, the folder 1801 "camera" is a folder of images captured by its own portable terminal (Hiro #1) and is grouped into a "20160628" folder affixed with the image capture date, and all image data captured on that day is stored in this folder. The folder 1802 "Share" on the other hand is a folder of images that are shared with other portable terminals as described for FIG. 17B. Images captured by the portable terminal itself are contained within the "Share" folder 1802, and for example, the "Party 20160628" folder is assigned to the "Share" folder 1802. However, these are not the image data itself, but hold the data showing the address of the corresponding image data in the "20160628" folder within the "Camera" folder 1801.

The respective folders on the screens showing the folder configuration need not always necessarily specify a folder actually containing the data itself. Image data stored in a folder configuration separate from that displayed on the screen may be presented to the user as a folder configuration shown in FIG. 20(a) conforming to those image data attributes. Here, as the image data attribute, "Camera" is set in the images captured by the portable terminal itself and the ID of the terminal is set in the images captured by other portable terminals.

The FIG. 20(b) shows an example of the screen display when the "20160628" folder is selected from the "Camera" folder 1801 in the screen in FIG. 20(a). The image data captured on this day is shown arrayed in a list of size-reduced images (Thumbnail) 1803. Here, "Camera" is attached as the attribute for each thumbnail. Among these thumbnails, touching a thumbnail the user wishes to view, displays an image of that thumbnail across the entire screen and the image can be enlarged.

The FIG. 20(c) shows an example of the screen display at the time the "Party 20160628" folder is selected in the "Share" folder 1802 in the screen in FIG. 20(*a*). The image data thumbnails 1804 for image data belonging to "Party 20160628" are displayed in the same layout as FIG. 20(*b*). The image data shown here is image data captured and shared by each portable terminal in the group, and a terminal ID (for example, "Arecha #1" is attached that shows the portable terminal that captured the image. Among these, the thumbnail 1805 attribute (terminal ID) is "Hiro #1" and is image data captured on the portable terminal itself.

The file name for the captured image for the attribute="Haru #1" following "20160628 #1" is "20160628 #3" which is not consecutive or namely not serving as a serial number. The file name is not consecutive because not all of the images captured by the portable terminal for "Haru #1" are shared since the user decides according to the circumstances whether to share and send the image data. The operation for sharing or not sharing the image is given in the following example. First of all, the captured image is automatically shared when a request of the illumination terminal function is made to another portable terminal to capture the image as described in Example 1. In all other image captures an inquiry is made to the user asking if the image is to be shared or not, and the user makes a decision. Or, an initial setting can be made on whether to share all images captured in a defined period by way of a schedule priority, even if the user has decided whether to share or not.

Also, the "From Arecha #1" folder belonging to the "Share" folder 1802 is image data that was received from terminal ID="Arecha #1" however this image data is not shared and is directly received from an individual. The "20151224" folder is image data captured on Dec. 24, 2015 and is image data shared with the group. These folder names can be freely changed by the user when necessary. Also, when a group is configured using under the condition recorded in the schedule or mail as shown for example in FIG. 11, the "Party" recorded in the schedule or mail can be automatically assigned to the folder name stored in the shared image data.

Figure 21:
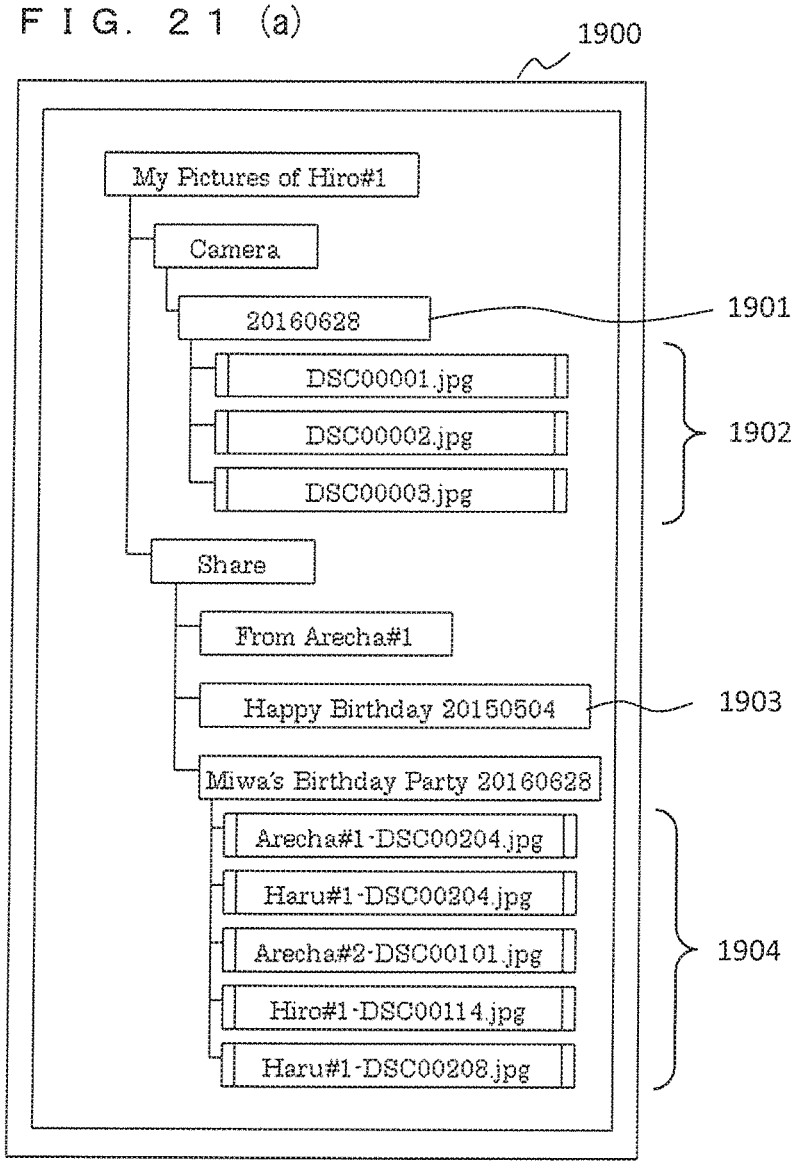
FIGS. 21(a) and 21(b) are drawings showing examples of the method for classifying the captured image data names.
Figure 21:
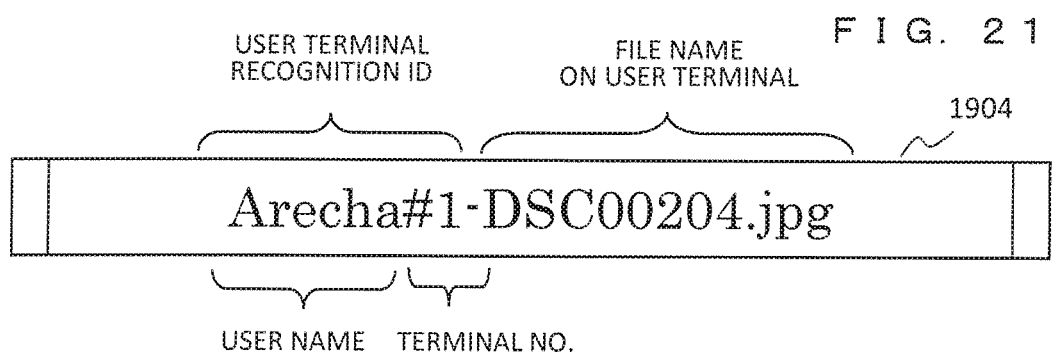

FIG. 21 is drawings showing the method for naming the captured image data. Naming is necessary to prevent conflicts from occurring among the image data file names within the same folder.

The FIG. 21(*a*) is the display screen 1900 showing a configuration example for a folder for managing the image files. The difference from the display screen 1800 in FIG. 20(*a*) is that the image data file names in the lower part of the folder are simultaneously displayed. For example, the plural file names 1902 belonging to "20160628" folder 1901 and the plural file names 1904 belonging to "Miwa's Birthday Party 20160628" folder 1903 are displayed. In this case, a unique file name must be utilized so as not to allow any redundant file names within the same folder.

Images captured by the portable terminal itself and belonging to the "Camera" folder are stored in the "20160628" folder showing the date, and the file name of "DSC"+four consecutive number digits+".jpg" (extension) is set. The four consecutive number digits are incremented by one digit each time one image is captured and set as a file name with consecutive number digits.

"Miwa's Birthday Party 20160628" folder 1903 that is the name recorded in the mail and schedule of FIG. 11 is generated in the "Share" folder. The file names 1904 for the image data captured and shared by each portable terminal are listed below "Miwa's Birthday Party 20160628". Using the unchanged file name 1902 for the image data captured on its own portable terminal under the "Camera" folder as the file names 1904, might cause redundant file names to occur among image data captured from different portable terminals. Therefore in this example, a terminal ID of each portable terminal (for example, "Arecha #1) is added to the file names to ensure that no conflicts occur among the file names. A process to change the file names is therefore carried out on the send side or the receive side for each portable terminal.

The FIG. 21(*b*) is a drawing for describing a specific method (also called nomenclature) for naming the file; and is described for file name 1904 in FIG. 21(*a*). In the file name 1904, the user terminal identification ID "Arecha #1" that is given to each portable terminal is added in front of the "DSC00204.jpg" file name on the user terminal, for the file name added when the image is captured by the original portable terminal. The user terminal identification ID is a combination of the user name "Arecha" and the terminal number "#1" for identifying each terminal in cases where the same user possesses plural portable terminals. Each image data can in this way be identified even if the file names "DSC00204.jpg" on the user terminal are the same. This naming method allows mutually sharing image data captured by plural portable terminals, and managing image data without file name conflicts occurring even when collectively managing the image data.

Example 7 separately groups the images captured on one's own portable terminal, from the images shared within a group and stores them; with no redundant file names occurring in the stored image data and so can satisfactorily manage the image data.

Examples 6 and 7 described above are capable of instantly sharing image data within the group by having the grouped portable terminals send images captured by each or any of the portable terminals to the other portable terminals within the group. The portable terminals participating in the group at this time may possess a sub-light function to link their illumination as described in Example 1; however possessing this function is not an indispensable condition. In other words, the object of Examples 6 and 7 is to generate groups for sharing image data regardless of whether or not there is imaging assist or support.

Each of the above examples specifically and in detail describes the device and system configuration in order to describe the present invention in an easy to understand manner. However the invention is not necessarily always limited to all of the described structures and configurations. Moreover, substituting a portion of an example into the structure of another example is possible and further, the structure of an example may be added to the structure of another example.

REFERENCE SIGNS LIST

100 . . . camera-equipped portable information terminal device (imaging terminal),
101, 102, 103 . . . portable information terminal device (illumination terminal)
120 . . . subject,
200 . . . CPU (control unit),
202 . . . camera sensor,
205, 700 . . . GPS unit,
207 . . . Bluetooth,
208 . . . wireless LAN,
212 . . . backlight LCD,
213 . . . flashlight,
205, 700 . . . GPS unit,
300, 310 . . . light emission command signal, 1000 to 1010 . . . camera-equipped portable information terminal device (portable terminal),
1201 . . . light assist request button
1213 . . . light assist agree button
1400 . . . schedule code
1510, 1520 . . . countdown (display, voice)
1704 . . . send button
1801 . . . camera folder
1802 . . . share folder
1902, 1904 . . . image file

The invention claimed is:

1. A camera-equipped portable information terminal device comprising:
an imaging device that captures an image of a subject;
a first illuminator configured to illuminate the subject;
a first transceiver configured to communicate with other portable information terminal devices; and
a first control unit that controls the imaging device and the first transceiver,
wherein the first control unit sends a light emission command signal to the other portable information terminal devices by way of the first transceiver, and causes a second illuminator of each of the other portable information terminal devices to emit light while in a linked state with an imaging operation of the imaging device, and
wherein when the imaging device captures the image of the subject by causing the second illuminator of each of the other portable information terminal devices to emit light, the first control unit stops the light emission by the first illuminator when a face of the subject is facing toward the imaging device.

2. The camera-equipped portable information terminal device according to claim 1, wherein the light emission command signal to be sent to the other portable information terminal devices includes an absolute time for the second illuminator of each of the other portable information terminal devices to emit light.

3. The camera-equipped portable information terminal device according to claim 2, comprising:
a GPS receiver that receives GPS information and acquires position information and time information of the camera-equipped portable information terminal device; and
a clock,
wherein the clock is calibrated based on the time information received by the GPS receiver.

4. The camera-equipped portable information terminal device according to claim 1, wherein before the image capture operation to capture the image of the subject is executed by the imaging device, the first control unit sends a light emission command signal for a pre-flash to the other portable information terminal devices, causes the second illuminator to perform a pre-flash of a plurality of changing light emission colors, and sets an illumination color that satisfactorily matches the subject.

5. The camera-equipped portable information terminal device according to claim 1, wherein in order to set the other portable information terminal devices to emit light by the second illuminator while in the linked state with the imaging operation of the imaging device, the first control unit confirms by way of the first transceiver that the other portable information terminal devices contain event information in common with the event information contained in a mail data or schedule data in the camera-equipped portable information terminal device.

6. The camera-equipped portable information terminal device according to claim 1,
wherein, the first control unit forms a group capable of mutually communicating within a local area by communicating with the other portable information terminal devices by way of the first transceiver, and
wherein, along with sending image data captured by the imaging device to the other portable information terminal devices belonging to the group by way of the first transceiver, the first control unit also receives image data sent from the other portable information terminal devices.

7. A portable information terminal device including an illuminator, the portable information terminal device comprising:
a second transceiver configured to communicate with a camera-equipped portable information terminal device, the camera-equipped portable information terminal device comprising i) an imaging device that captures an image of a subject, ii) a first transceiver configured to communicate with other portable information terminal devices including the portable information terminal device, and iii) a first control unit that controls the imaging device and the first transceiver; and
a second control unit that controls the illuminator and the second transceiver,
wherein the first control unit of the camera-equipped portable information terminal device issues a screen or voice showing a countdown for a specified period until an image capture operation is executed when capturing the image of the subject by the imaging device, and sends a light emission command signal to the other portable information terminal devices by way of the first transceiver for the specified period, and
wherein the second control unit receives the light emission command signal from the camera-equipped portable information terminal device by way of the second transceiver, and emits light by the illuminator linked with the imaging operation of the camera-equipped portable information terminal device.

8. The portable information terminal device according to claim 7, wherein in order to start a linked illumination operating mode for the illuminator to emit light while linked with an imaging operation of the camera-equipped portable information terminal device, a button to command starting the linked illumination operating mode is shown on an initial screen displayed in an operable state from among transition screens after shifting from a portable information terminal device operation standby state.

9. A linked imaging method for capturing images by linking a camera-equipped portable information terminal device with other portable information terminal devices:
wherein the camera-equipped portable information terminal device includes a first illuminator,
wherein the other portable information terminal devices include respective second illuminators,
wherein the camera-equipped portable information terminal device sends a light emission command signal to the other portable information terminal devices when capturing images,
wherein the other portable information terminal devices emit light by the respective second illuminators in compliance with the light emission command signal received from the camera-equipped portable information terminal device, wherein the camera-equipped portable information terminal device captures an image of a subject by utilizing the light emitted from the respective second illuminators, and wherein when the camera-equipped portable information terminal device captures the image of the subject by causing the respective second illuminators of the other portable information terminal devices to emit light, light emission by the first illuminator is stopped when a face of the subject is facing toward the imaging device.

10. A camera-equipped portable information terminal device comprising:

an imaging device that captures an image of a subject;

a first transceiver configured to communicate with other portable information terminal devices; and a first control unit that controls the first transceiver, wherein the first control unit forms a group capable of mutually communicating within a local area by communicating with the other portable information terminal devices by way of the first transceiver, and wherein, along with sending image data captured by the imaging device to the other portable information terminal devices belonging to the group by way of the first transceiver, the first control unit also receives image data sent from the other portable information terminal devices, and wherein the first control unit automatically cancels the formed group, after a predetermined period of time has passed since the group is formed.

11. The camera-equipped portable information terminal device according to claim 10, wherein among image data captured by the imaging device, the first control unit sends only the image data captured in the predetermined period of time while the group is formed, to the other portable information terminal devices.

12. The camera-equipped portable information terminal device according to claim 10, wherein in order to form the group among the other portable information terminal devices, the first control unit sends a communication for requesting forming the group to the other portable information terminal devices by way of the first transceiver, and forms the group after confirming that both portable information terminal devices contain designated information by mutual communication.

13. The camera-equipped portable information terminal device according to claim 10, comprising a display unit that shows the image data, wherein the display unit sorts a list of the image data captured by the imaging device, and a list of the image data sent or received among portable information terminal devices belonging to the group into different folders and displays them.

14. The camera-equipped portable information terminal device according to claim 10, wherein the first control unit manages file names sent or received among portable information terminal devices belonging to the group by utilizing new file names attached with a name for identifying the portable information terminal devices that captured the image data.

15. A portable information terminal device comprising:

a second transceiver configured to communicate with a camera-equipped portable information terminal device, the camera-equipped portable information terminal device comprising i) an imaging device that captures an image of a subject, ii) a first illuminator configured to illuminate the subject, iii) a first transceiver configured to communicate with other portable information terminal devices, and iv) a first control unit that controls the imaging device and the first transceiver; and a second control unit that controls the second transceiver, wherein the second control unit forms a group capable of mutually communicating within a local area by communicating with the camera-equipped portable information terminal device by way of the second transceiver, and receives image data captured by and sent from the camera-equipped portable information terminal device belonging to the group by way of the second transceiver, and wherein the first control unit automatically cancels the formed group, after a predetermined period of time has passed since the group is formed.

16. The portable information terminal device according to claim 15, wherein the second control unit further forms a group among the other portable information terminal devices by way of the second transceiver, and when the image data that the camera-equipped portable information terminal device sends is received, sends the image data to the other portable information terminal devices.

17. The camera-equipped portable information terminal device according to claim 15, wherein in order to form the group among the other portable information terminal devices, the first control unit sends a communication for requesting forming the group to the other portable information terminal devices by way of the first transceiver, and forms the group after confirming that both portable information terminal devices contain designated information by mutual communication.

* * * * *